United States Patent
Trigoni et al.

(10) Patent No.: US 10,502,576 B2
(45) Date of Patent: Dec. 10, 2019

(54) DETERMINING THE POSITION OF A MOBILE DEVICE IN A GEOGRAPHICAL AREA

(71) Applicant: OXFORD UNIVERSITY INNOVATION LIMITED, Oxford (GB)

(72) Inventors: Agathoniki Trigoni, Oxford (GB); Zhuoling Xiao, Oxford (GB)

(73) Assignee: OXFORD UNIVERSITY INNOVATION LIMITED, Oxford (GB)

(*) Notice: Subject to any disclaimer, the term of this patent is extended or adjusted under 35 U.S.C. 154(b) by 315 days.

(21) Appl. No.: 15/509,771

(22) PCT Filed: Sep. 10, 2015

(86) PCT No.: PCT/GB2015/052615
§ 371 (c)(1),
(2) Date: Mar. 8, 2017

(87) PCT Pub. No.: WO2016/042296
PCT Pub. Date: Mar. 24, 2016

(65) Prior Publication Data
US 2017/0241787 A1  Aug. 24, 2017

(30) Foreign Application Priority Data
Sep. 15, 2014 (GR) .............................. 20140100462
Jan. 12, 2015 (GB) .................................... 1500411.2

(51) Int. Cl.
*G01C 21/20* (2006.01)
*G01C 21/12* (2006.01)

(52) U.S. Cl.
CPC ........... *G01C 21/206* (2013.01); *G01C 21/12* (2013.01)

(58) Field of Classification Search
CPC ..... G01C 21/206; G01C 21/12; G01C 22/006
See application file for complete search history.

(56) References Cited

U.S. PATENT DOCUMENTS

| 6,826,477 B2 | 11/2004 | Ladetto et al. |
| 2002/0002863 A1 | 1/2002 | Slycke et al. |

(Continued)

FOREIGN PATENT DOCUMENTS

| EP | 2527791 | 11/2012 |
| WO | WO 2011/063285 | 5/2011 |
| WO | WO 2014/074837 | 5/2014 |

OTHER PUBLICATIONS

International Search Report for PCT/GB2015/052615 dated May 13, 2016, 9 pages.

(Continued)

*Primary Examiner* — Bryan Bui
(74) *Attorney, Agent, or Firm* — Lathrop Gage LLP

(57) ABSTRACT

A mobile device (100) carried by a user has sensors providing acceleration and orientation information. These are processed to provide trajectory for the device. The processing includes improved methods using different modules (1, 2, 3,5, 6, 7) for classifying the motion (1) and detecting a user's steps (5), tracking the orientation (3) and acceleration (2) of the device (100), estimating the length of the user's steps (6) and estimating the heading (7) of the user. The trajectories are compared to a map and corrected by the constraints provided by the map. Parameters of the methods of producing the trajectories are optimised on the basis of maximising probability of the trajectory found by the map matching given the indicated trajectory.

23 Claims, 18 Drawing Sheets

(56) References Cited

U.S. PATENT DOCUMENTS

| | | |
|---|---|---|
| 2009/0005975 A1 | 1/2009 | Forstall et al. |
| 2009/0043504 A1 | 2/2009 | Bandyopadhyay et al. |
| 2010/0303293 A1* | 12/2010 | Caduff .................... G06F 3/011 382/103 |
| 2011/0087450 A1 | 4/2011 | Borenstein et al. |
| 2011/0207471 A1 | 8/2011 | Murray et al. |
| 2012/0072166 A1 | 3/2012 | Keal et al. |
| 2012/0136573 A1 | 5/2012 | Anardhanan et al. |
| 2012/0203453 A1 | 8/2012 | Lundquist et al. |
| 2013/0106697 A1 | 5/2013 | Kulik |
| 2013/0158941 A1 | 6/2013 | Yang et al. |
| 2013/0244691 A1 | 9/2013 | Kelly |
| 2013/0332064 A1 | 12/2013 | Funk et al. |
| 2013/0332065 A1 | 12/2013 | Hakim et al. |
| 2013/0338961 A1 | 12/2013 | Youssef et al. |
| 2014/0067262 A1 | 3/2014 | Iketani |

OTHER PUBLICATIONS

Melania Susi et al. "Motion Mode Recognition and Step Detection Algorithms for Mobile Phone Users", Sensors, vol. 13, No. 2., Jan. 24, 2013 (Jan. 24, 2013), pp. 1539-1562.

Xiao et al. (2014) "Lightweight Map Matching for Indoor Localisation using Conditional Random Fields," 2014 IEEE, 12 pp.

* cited by examiner

DETERMINING THE POSITION OF A MOBILE DEVICE IN A GEOGRAPHICAL AREA

FIELD OF THE INVENTION

The present invention relates to methods and devices related to determining the position of a mobile device in a geographical area. The invention is particularly applicable where the geographical area is an indoor area. More particularly, but not exclusively it relates to improved methods of processing data from orientation and acceleration sensors.

BACKGROUND

Indoor tracking and navigation is a fundamental need for pervasive and context-aware smartphone applications. Applications of indoor positioning include smart retail, navigation through large public spaces like transport hubs, and assisted living. The ultimate objective of indoor positioning systems is to provide continuous, reliable and accurate positioning on smartphone class devices. Inertial tracking, or "dead reckoning", with or without the aid of existing maps, has received a lot of attention recently, but existing solutions lack generality and robustness. They are typically targeted at achieving high accuracy in specific contexts, and are fine tuned for specific phone placements (i.e. positions on the user's body, etc.), users, devices or environments. When tested in different conditions from the ones designed for, their performance degrades significantly. For example, the majority of existing solutions assume that the user holds the device in a specific way (e.g. texting mode) [1] (see list of references below). More advanced solutions first use a classifier to infer the user walking pattern and phone placement (e.g. hand swinging, texting, etc.) [2], [3], and then exploit this information to optimize the inertial tracking system [4]. However, even the state of the art approaches can only handle a limited number of phone placement options. When the user deviates from this predefined set, the tracking system is at a loss for how to handle the new case. Another major issue is that the inertial tracking system typically assumes knowledge of a number of parameters that account for user, device and environment variability. Examples of user variability parameters include those that relate the user height, step frequency and acceleration variance, to their step length [5]-[8]. Further parameters are needed to model the noise of inertial sensors, and environment-specific magnetic distortions [9]. The vast tuning effort involved in optimizing pedestrian dead reckoning (PDR) systems is one of the major hurdles that prevent inertial tracking systems from becoming mainstream.

In the present invention a move away from context-specific fine-tuning is made, to more general-purpose robust tracking. Another aspect is lifelong learning of the system.

Herein reference is made to the following publications:

[1] Z. Xiao, H. Wen, A. Markham, and N. Trigoni, "Lightweight map matching for indoor localization using conditional random fields (BEST PAPER)," in The International Conference on Information Processing in Sensor Networks (IPSN'14), (Berlin, Germany), 2014.

[2] J. Yang, "Toward physical activity diary: motion recognition using simple acceleration features with mobile phones," in Proc. 1st Int. workshop Interactive multimedia for consumer electronics, (Beijing, China), pp. 1-9, 2009.

[3] J. S. Wang, C. W. Lin, Y. T. Yang, and Y. J. Ho, "Walking pattern classification and walking distance estimation algorithms using gait phase information," IEEE Trans. Biomedical Engineer., vol. 59, no. 10, pp. 2884-2892, 2012.

[4] N. Roy, H. Wang, and R. R. Choudhury, "I am a smartphone and i can tell my users walking direction," in Mobisys, 2014.

[5] L. Fang, P. Antsaklis, L. Montestruque, M. B. McMickell, M. Lemmon, Y. Sun, and H. Fang, "Design of a wireless assisted pedestrian dead reckoning system—the NavMote experience," Instrumentation and . . . , vol. 54, no. 6, pp. 2342-2358, 2005.

[6] S. H. Shin, C. G. Park, and J. W. Kim, "Adaptive step length estimation algorithm using low-cost MEMS inertial sensors," in Proc. IEEE Sensors App. Symp., no. February, (San Diege, Calif., USA), pp. 1-5, 2007.

[7] I. Bylemans, M. Weyn, and M. Klepal, "Mobile Phone-Based Displacement Estimation for Opportunistic Localisation Systems," in Proc. 3rd Int. Conf. Mob. Ubi. Comput. Syst. Services Technol. (UBICOMM'09), (Sliema), pp. 113-118, Ieee, Oct. 2009. 29

[8] V. Renaudin, M. Susi, and G. Lachapelle, "Step length estimation using handheld inertial sensors," Sensors, vol. 12, pp. 8507-8525, January 2012.

[9] J. Chung, M. Donahoe, C. Schmandt, and I.-J. Kim, "Indoor location sensing using geo-magnetism," in Mobisys, 2011.

[10] M. Susi, V. Renaudin, and G. Lachapelle, "Motion mode recognition and step detection algorithms for mobile phone users.," Sensors, vol. 13, pp. 1539-62, January 2013.

[11] Y. S. Suh, "Orientation Estimation Using a Quaternion-Based Indirect Kalman Filter With Adaptive Estimation of External Acceleration," IEEE Trans. Instrument. Measurement, vol. 59, pp. 3296-3305, December 2010.

[12] X. Yun and E. R. Bachmann, "Design, Implementation, and Experimental Results of a Quaternion-Based Kalman Filter for Human Body Motion Tracking," IEEE Trans. Robotics, vol. 22, pp. 1216-1227, December 2006.

[13] B. Huyghe, J. Doutreloigne, and J. Vanfleteren, "3D orientation tracking based on unscented Kalman filtering of accelerometer and magnetometer data," in Proc. IEEE Sens. App. Symp. (SAS'09), (New Orleans, La., USA), pp. 1-5, 2009.

[14] T. Harada, T. Mori, and T. Sato, "Development of a Tiny Orientation Estimation Device to Operate under Motion and Magnetic Disturbance," The Int. J. Robotics Res., vol. 26, pp. 547-559, June 2007.

[15] D. Mizell, "Using gravity to estimate accelerometer orientation," in Proc. 7th IEEE Int. Symp. Wearable Computers (ISWC'03), pp. 252-253, Ieee, 2003.

[16] H. Lu, J. Yang, Z. Liu, N. D. Lane, T. Choudhury, and A. T. Campbell, "The Jigsaw continuous sensing engine for mobile phone applications," in Proc. 8th ACM Conf. Embedded Netw. Sensor Syst. (SenSys'10), (New York, N.Y., USA), pp. 71-84, ACM Press, 2010.

[17] S. Hemminki, P. Nurmi, and S. Tarkoma, "Accelerometer-based transportation mode detection on smartphones," in Proc. 11th ACM Conf. Embedded Netw. Sensor Syst. (Sensys'13), (New York, N.Y., USA), pp. 1-14, 2013.

[18] J. Rose and J. G. Gamble, Human Walking. Baltimore, Pa., USA: Lippincott, Williams and Wilkins, 3rd ed., 2006.

[19] J. W. Kim, H. J. Jang, D. H. Hwang, and C. Park, "A step, stride and heading determination for the pedestrian navigation system," Journal of Global Position. Syst., vol. 3, no. 1, pp. 273-279, 2004.

[20] S. Beauregard and H. Haas, "Pedestrian dead reckoning: A basis for personal positioning," in Proc. 3rd Workshop Pos. Nay. Commun. (WPNC'06), pp. 27-36, 2006.

[21] S. H. Shin, M. S. Lee, and P. C. G., "Pedestrian dead reckoning system with phone location awareness algorithm," in Proc. IEEE/ION Position Location Nay. Symp. (PLANS'10), pp. 97-101, 2010.

[22] P. Goyal, V. J. Ribeiro, H. Saran, and A. Kumar, "Strap-down Pedestrian Dead-Reckoning system," in Proc. Int. Conf. Indoor Pos. Indoor Nay. (IPIN'11), pp. 1-7, Ieee, September 2011.

[23] N. Ravi, N. Dandekar, P. Mysore, and M. Littman, "Activity recognition from accelerometer data," in Proc. 7th Conf. Innov. App. Artificial Intell. (AAAI'05), pp. 1541-1546, 2005.

[24] J.-g. Park, A. Patel, D. Curtis, S. Teller, and J. Ledlie, "Online pose classification and walking speed estimation using handheld devices," in Proc. ACM Conf. Ubi. Comput. (UbiComp'12), (New York, N.Y., USA), pp. 1-10, ACM Press, 2012.

[25] A. Brajdic and R. Harle, "Walk detection and step counting on unconstrained smartphones," in Proc. ACM Conf. Ubi. Comput. (UbiComp'13), (Zurich, Switzerland), pp. 225-234, ACM Press, 2013. 30

[26] H. Ying, C. Silex, and A. Schnitzer, "Automatic step detection in the accelerometer signal," in Proc. 4th Int. Workshop Wearable and Implantable Body Sensor Netw. (BSN'07), pp. 80-85, 2007.

[27] A. Rai and K. Chintalapudi, "Zee: Zero-effort crowdsourcing for indoor localization," in Proc. 18th Ann. Int. Conf. Mob. Comput. Netw. (MobiCom'12), (Istanbul, Turkey), pp. 1-12, 2012.

[28] M. Alzantot and M. Youssef, "UPTIME: Ubiquitous pedestrian tracking using mobile phones," in Proc. IEEE Wirel. Commun. Netw. Conf. (WCNC'12), pp. 3204-3209, Ieee, April 2012.

[29] R. Harle, "A Survey of Indoor Inertial Positioning Systems for Pedestrians," IEEE Commun. Surveys & Tutorials, vol. 15, pp. 1281-1293, January 2013.

[30] P. Barralon, N. Vuillerme, and N. Noury, "Walk detection with a kinematic sensor: frequency and wavelet comparison," in Proc. Ann. Int. Conf. IEEE Eng. Med. Bio. Soc., vol. 1, pp. 1711-4, January 2006.

[31] M. N. Nyan, F. E. H. Tay, K. H. W. Seah, and Y. Y. Sitoh, "Classification of gait patterns in the time-frequency domain," J. Biomech, vol. 39, pp. 2647-56, January 2006.

[32] E. Foxlin, "Pedestrian tracking with shoe-mounted inertial sensors," IEEE Comput. Graph. App., vol. 25, no. 6, pp. 38-46, 2005.

[33] R. Faragher and R. Harle, "SmartSLAMan efficient smartphone indoor positioning system exploiting machine learning and opportunistic sensing," in Proc. 26th Int. Tech. Meet. Satel. Div. Institute of Nay. (ION GNSS+'13), pp. 1-14, 2013.

[34] W. Chen, R. Chen, Y. Chen, H. Kuusniemi, and J. Wang, "An effective Pedestrian Dead Reckoning algorithm using a unified heading error model," in Proc. IEEE/ION Position, Location and Nay. Symp, pp. 340-347, Ieee, May 2010.

[35] V. Renaudin, M. Susi, and G. Lachapelle, "Step length estimation using handheld inertial sensors," Sensors, vol. 12, no. 7, pp. 8507-8525, 2012.

[36] F. Li, C. Zhao, G. Ding, J. Gong, C. Liu, and F. Zhao, "A reliable and accurate indoor localization method using phone inertial sensors," in Proc. ACM Conf. Ubi. Comput. (UbiComp'12), (New York, N.Y., USA), p. 421, ACM Press, 2012.

[37] J. Huang, D. Millman, M. Quigley, D. Stavens, S. Thrun, and A. Aggarwal, "Efficient, generalized indoor WiFi GraphSLAM," in Proc. IEEE Int. Conf. Robot. Automat., (Shanghai, China), pp. 1038-1043, Ieee, May 2011.

[38] M. H. Afzal, V. Renaudin, and G. Lachapelle, "Assessment of indoor magnetic field anomalies using multiple magnetometers," in Proc. 23th Int. Tech. Meet. Satel. Div. Institute of Nay. (ION GNSS+'10), no. September, pp. 21-24, 2010.

[39] H. Trinh, A machine learning approach to recovery of scene geometry from images. Ph.d thesis, Toyota Technological Institute at Chicago, 2010.

SUMMARY OF THE INVENTION

According to the present invention there are provided various methods etc. for processing sensor data from sensors of a device as defined in the appended claims.

The invention employs two main principles:

Robustness: It uses a phone placement classification scheme that is simple, yet comprehensive, i.e. covers all possible ways of attaching the phone to the human body. Based on this scheme, it provides what is called here "R-PDR", a robust pedestrian dead reckoning (PDR) algorithm that is based on general physics principles underpinning human motion, and avoids using context-specific heuristics, such as if phone is in a pant (or "trouser") pocket, use technique A; else if in text mode, use technique B. By design, R-PDR aims to be robust to user, device and phone placement variability.

Lifelong learning: While PDR parameters often require context-specific tuning, in the present invention this information is learnt, rather than being manually tuned or assumed as an initial input. To this end, it uses an interplay between the pedestrian dead reckoning (PDR) and map-matching (MM) layers. Existing work typically feeds PDR output into a map matching technique (e.g. particle filter/HMM/CRF), which exploits map information to correct the inertial trajectory. A part of the invention, which named herein Lifelong Learning Tracker (LL-Tracker) introduces a reverse link between the two layers. It augments the functionality of the map-matching layer to learn context-specific parameters, which are then fed back to the underlying PDR layer. The efficacy of LL-Tracker in learning parameters of the present robust pedestrian dead reckoning algorithm (R-PDR) is demonstrated, however lifelong learning is broadly applicable to improve the performance of any PDR implementation that requires parameter tuning.

To summarise, the contributions and aims of the present invention include:

- A novel comprehensive way of classifying human motion.
- A robust pedestrian dead reckoning algorithm (R-PDR) that exploits the new classification scheme and is robust to user, device and phone placement variability.
- A lifelong learning tracker (LL-Tracker) that eases the effort of parameter tuning by introducing a feedback loop between the map matching and pedestrian dead reckoning layers.
- Also provided below are an evaluation of R-PDR and LL-Tracker of the invention in a wide range of contexts, varying device type, user, phone placement and building.

An aim of the present invention is to provide an indoor tracking system that is robust to noise introduced by inertial measurement unit (IMU) sensors and to context variability. Note that PDR algorithms typically include processes for motion mode recognition, step detection, step length estimation and step heading estimation. In relation to this the invention addresses the following key challenges:

Motion classification: Despite a plethora of work on recognising different motion modes, to our knowledge, there is still a lack of a comprehensive classification scheme that captures the wide range of human motion and device attachment. Moreover, solutions that capture many motion modes are typically complex, since they have to include a large number of motion specific optimisation rules, especially for solving the problem of step detection.

Device orientation estimation: The performance of the PDR algorithm largely depends on the ability to accurately track the orientation of the mobile device. This task is particularly challenging in the context of unconstrained (mobile/wearable) devices embedded with low-cost IMU sensors. Generally, the gyro drift and magnetic disturbances, especially in indoor environments, are the major obstacles to accurate orientation estimation. Addressing this problem is essential, because orientation information is used by nearly all tasks of the PDR algorithm.

Acceleration long/short term drift: Another major challenge is the correction of short-term and long-term drift in the acceleration signal. The noise that distorts the acceleration signal is a major issue because it causes inaccuracy in the orientation estimation. A small tilt error of the device would distort the acceleration signals projected to the earth coordinate frame, with part of the vertical acceleration, e.g. gravity component, going to the horizontal acceleration.

Parameter tuning: The inertial tracking system generally needs careful tuning of parameters such as sensor bias and step length estimation parameters, to name a few. The fact that certain parameters are context-specific, i.e. dependent on the environment, device or individual, poses a great challenge to the widespread application of inertial tracking systems.

DESCRIPTION OF THE DRAWINGS

Embodiments of the present invention will now be described, by way of example only, with reference to the accompanying drawings, of which.

DETAILED DESCRIPTION

Figure 1:
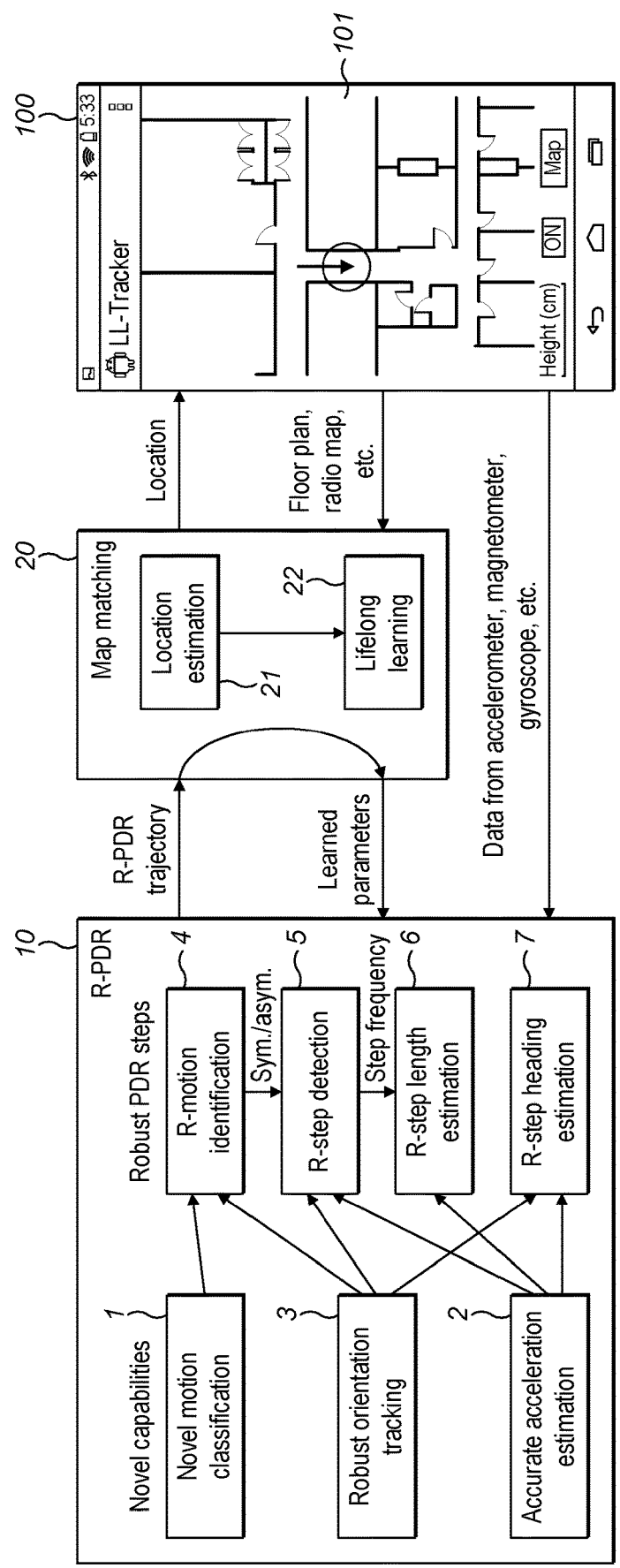
FIG. 1 is the overall architecture of the system according to an embodiment of the invention.

FIG. 1 shows the system architecture in an embodiment of the invention.

A smart phone 100 having sensors, such as an accelerometer, magnetometer, gyroscope, etc. is provided with software, the modules of which are shown in the rest of the Figure. The accelerometer, magnetometer and gyroscope are the main sensors but others could be taken into account by the system to provide position, acceleration and orientation signals, such as a barometer, light sensors and so on.

A first layer of the software, a Robust Pedestrian Dead Reckoning (R-PDR) 10, is equipped with three novel modules: Firstly, it features a novel motion classification scheme 1, which uses only two classes in its classification, but nonetheless captures a wide spectrum of human motion and device placement combinations. Secondly, leveraging simple observations about human motion, R-PDR has an acceleration estimate module 2 with a robust mechanism for correcting short-term and long-term acceleration bias. Thirdly, the R-PDR has a device orientation estimating module 3 that is novel and robust. (The word "layer" is uses herein only to denote a larger software module that contains smaller ones of modules described in.)

These three modules of the R-PDR are described below, followed by an explanation of how they are instrumental to its further functional modules of a motion identification module 4, a step detection module 5, a step length estimation module 6 and a step heading module.

The output of the R-PDR layer 10, a trajectory for the user, in particular in this embodiment it comprises a distance value and heading value for each step taken by the user of the device. (In detail, these are a mean and variance value for each of the step distance and step heading, or some other estimate and measure of uncertainty.) This data is then fed into the Map Matching layer 20, which takes into account map constraints to correct the problem of long-term drift. Unlike existing systems where information flows upwards only, there is a feedback loop provided. The map-matching layer 20 has a location estimation module which uses the trajectory along with a map (101 indicates a display of the map on a screen of the device) to provide a location, the location being used, for example to inform the user of it. The location signal, namely a mean and variance, or some other estimate and measure of uncertainty of the location, is passed to a lifelong learning module 22 which fine tunes parameters used by the R-PDR layer 10, and it feeds those back from time to time to the the R-PDR layer 10. The resulting end-to-end algorithm is called herein a Lifelong Learning Tracker (LL-Tracker), which learns from experience and gradually gets better at handling familiar tracking scenarios. Later below the feedback loop is described in more detail and examples that illustrate the benefits of cross-layer optimisation are provided.

The novel capabilities of the software are now described in more detail, starting with the novel classification for addressing the current challenges in classifying human motion.

Existing work has proposed techniques for identifying a variety of modes of motion of smart phone users, including phoning, texting, hand swinging, static, etc. [8], [10]. However, these motion modes are only a subset of all possible human motion modes, and suffice in controlled experiment settings. To make motion mode recognition work in unconstrained real world settings, a large number of new motion modes have to be defined, leading to a steep rise if one aims to count all possible motion modes of human beings. Instead of separating motion modes according to their differences, in this embodiment of the invention the approach is taken of grouping them together as much as possible using the features they have in common. Specifically, a very simple classification scheme is used, consisting of only two modes: symmetrical and asymmetrical.

Informally, the symmetrical mode is the class of motions that are impacted in a similar manner by the movement of the left and right leg; the asymmetrical mode includes all other types of motion. Examples of typical symmetrical motion modes include, but are not limited to:
- Texting: The mobile device is held in front of the user while walking;
- Phoning: The mobile device is held close to the head while walking;
- Heavy bag: The mobile device is put in a heavy bag (so the hand of the pedestrian is not swinging) while walking;
- Shirt pocket: The mobile device is put in a shirt pocket while walking;
- Static: The mobile device is not moving, wherever it is put.

Similarly, some typical asymmetrical motion modes include:
- Hand swinging: The mobile device is held in a swinging hand while walking;
- Trouser pocket: The mobile device is put in a trouser pocket (front or back) while walking;
- Belt: The mobile device is fastened to the belt while walking; Handshaking: The mobile device is (possibly periodically) shaken while not moving.

Figure 2:
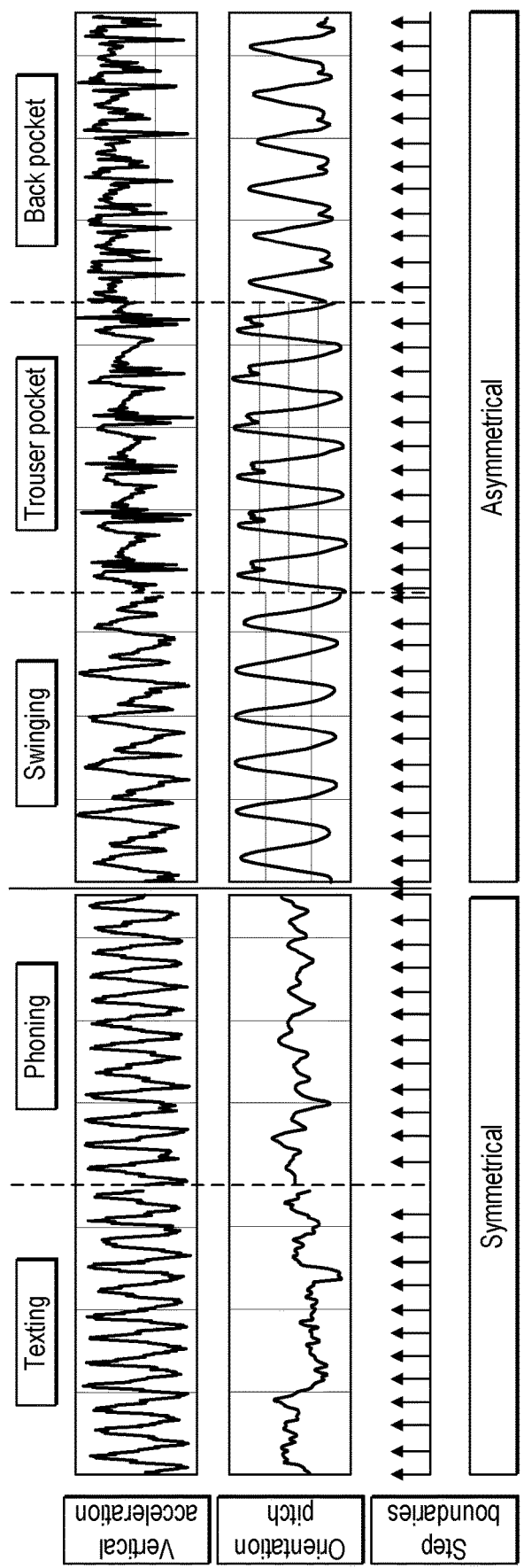
FIG. 2 is the acceleration and orientation signals of some typical motions of a device carried by a user.

FIG. 2 illustrates a few examples of symmetrical and asymmetrical motion modes. Notice that all symmetrical motion modes have similar periodic acceleration signals, with a period corresponding to a single step, while all asymmetrical motion modes have similar periodic orientation patterns, with a period corresponding to two steps. The benefits of classifying motions into symmetrical and asymmetrical are three fold. First, it is a comprehensive scheme that leaves no motion out. Second, the motion classification step itself is a simple task, which is implemented with simple cross correlation with sine waves (described later below). Lastly, the fact that symmetrical motions have periodic acceleration signals while asymmetrical motion modes has periodic orientation signals greatly facilitates the task of step detection (again discussed later below). So far a scheme for motion classification has been discussed; its implementation in the motion identification module is described later below.

Being able to accurately track the device's orientation is the foundation for accurate long term inertial tracking. This is because most steps of PDR, including step detection, and step length and heading estimation, are based on the orientation of the device. However, tracking device orientation remains a major issue with low-cost inertial measurement unit (IMU) sensors embedded in mobile devices that are not constrained to be held in a certain way, which IMU sensors include a gyro and a magnetometer for the purpose. The gyro drift and magnetic disturbances especially in indoor environments are the major obstacles on the way to accurate orientation tracking. Most existing software uses Kalman filters, e.g. indirect Kalman filters [11], extended Kalman filters (EKF) [12] and Unscented Kalman filters (UKF) [13], to track device orientation with angular velocities from a gyroscope to periodically update the orientation. The gyro drift in horizontal plane (yaw) can be compensated with magnetic field measurements, especially if there is a map of the area's magnetic distortions. However, the gyro drifts in roll and pitch angles are still a pressing problem for devices with motion acceleration [14]. This problem is addressed in this embodiment of the invention by accurately estimating the gravitational acceleration from the raw accelerometer signal. The gravity vector is then used as an observation in the Kalman filter to correct drift in roll and pitch.

Figure 16A:
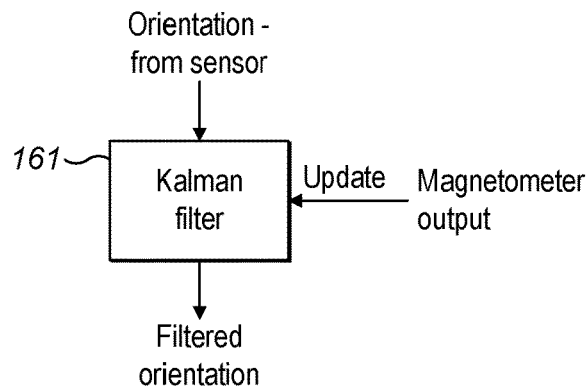
FIG. 16a is a diagram of a known Kalman filter arrangement for the orientation signal.

So FIG. 16A shows a prior art module for processing orientation information. A Kalman filter 161 receives the orientation signal from the gyro (i.e. the base angular velocity signal from the gyro sensor integrated to become the orientation signal) with the orientation signal being provided as the signal being filtered, with a magnetometer signal being applied as the update input signal to the Kalman filter.

Figure 16B:
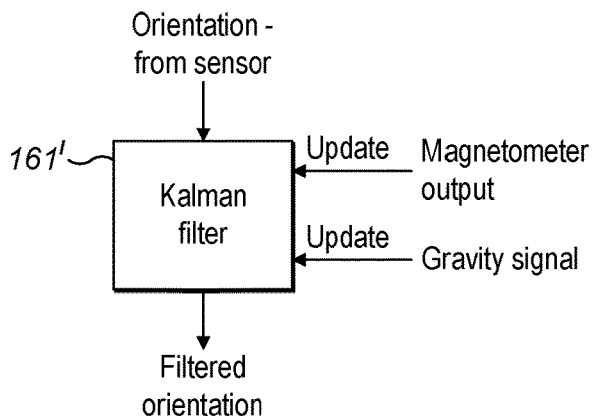
FIG. 16b is a diagram of a Kalman filter arrangement for the orientation signal using both a magnetometer and gravity signal as update inputs.

FIG. 16B shows a similar part of the present embodiment (which is part of the orientation tracking module 3). This also employs a Kalman filter 161' but has an additional update signal, which is a signal indicating the direction of the gravity acting on the device. So this signal also is used to update the filtered orientation signal. The Kalman filter may be at least any of the variants of Kalman filter mentioned above. A gravity signal can be provided in various ways. Some known methods of that per se, as well as, the preferred method in this embodiment, which is of superior accuracy are described below.

Currently there are two dominant approaches to estimate the gravity component of accelerometer measurements. The first approach, proposed by Mizell et. al [15], uses the mean over a window of fixed duration to estimate the gravity. This approach is elegant and simple but it is not suitable for mobile devices used by pedestrians. The major reason is that a change in orientation introduces a considerable lag to accurate gravity estimation. To reduce the lag, it is possible to shorten the time window over which the gravity is estimated [16]. However, this comes with a decrease in the accuracy of gravity estimates. The second approach, proposed by Hemminki et. al [17], estimates gravity only when the variation of the acceleration signals over a period of time is below a certain threshold. This approach reduces the lag introduced by the first approach, but also suffers from two limitations. First, this approach works only when the mobile device is static for a period of time; it does not work when the user is in motion, which is when gravity estimates are mostly needed. Secondly, the thresholds of variations in different motion modes are different, making it hard to apply in real-world settings.

To address these limitations, this embodiment uses a novel algorithm that can accurately estimate the gravity vector without lag and that works all the time. The key fact that it exploits is that gyro sensors are reliable over a short period of time.

Figure 14:
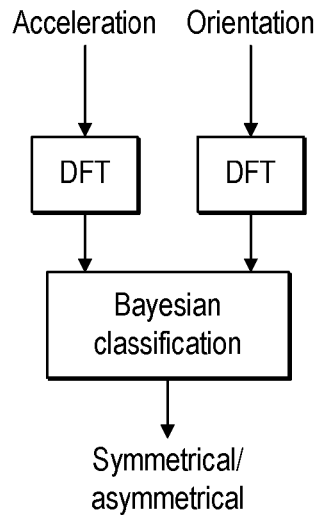
FIG. 14 is a diagram of a motion identification module of an embodiment of the invention.

The algorithm is as follows. Assume we want to estimate the gravity at time t given a window of historical raw accelerometer data $a_{t-T:t}$ of size T. In a first step (see FIG. 14) the acceleration signals from the accelerometer $a_{t-T:t-1}$ are projected to the phone's coordinate system at time stamp t and then in a second step the gravity vector at time t, $g_t$ is estimated as the mean of the acceleration readings after the projection:

$$g_t = \Sigma_{\tau=t-T}^{t} R_{\tau \to t}^T \cdot a_\tau / T \tag{1}$$

where $R_{\tau \to t}^T$ is the projection matrix from device's coordinate frame at time stamp τ to device's coordinate frame at time t This allows for the rotation of the device during the period T. This projection matrix can be easily obtained from gyro sensor readings for the times t and . These gyro sensor readings may be, for example, the raw signals from the gyro sensor or the output of the Kalman filter (those do not differ much from each other over the timescale involved and the option of using either is shown with dashed arrows in FIG. 16C) (Note also that superscript $^T$ denotes a transpose matrix.)

Figure 3A:
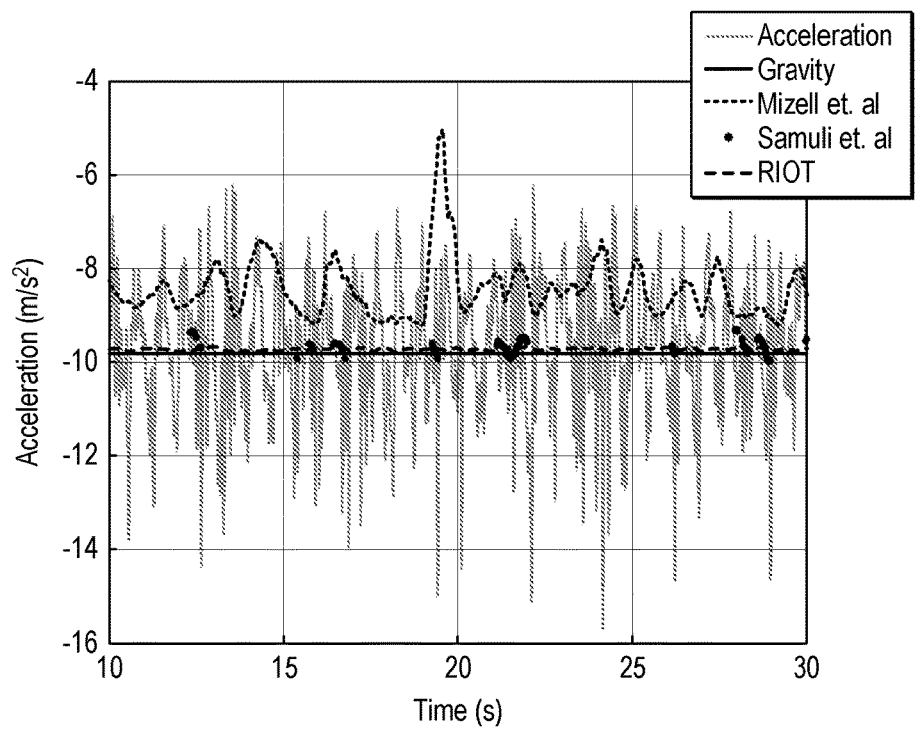
FIG. 3a is a graph comparing gravity estimated with various techniques.

Experiments have been conducted to compare the proposed algorithm with the state-of-the-art gravity estimation techniques. In the experiments the pedestrian walked normally with the mobile device in texting mode. The gravity vector was estimated using the approaches of the invention and the state-of-the art. The gravity magnitude, as shown in FIG. 3(a), was then estimated as the acceleration in the Z axis. It is observed that Mizell's approach is the most inaccurate due to its inability to manage the orientation change of the device. Samuli's approach provides more accurate, yet very sparse gravity estimates, because in most cases the motion of the pedestrian makes the variation in acceleration bigger than the threshold. In comparison, the approach of this embodiment offers accurate gravity estimates and works continuously.

Figure 16C:
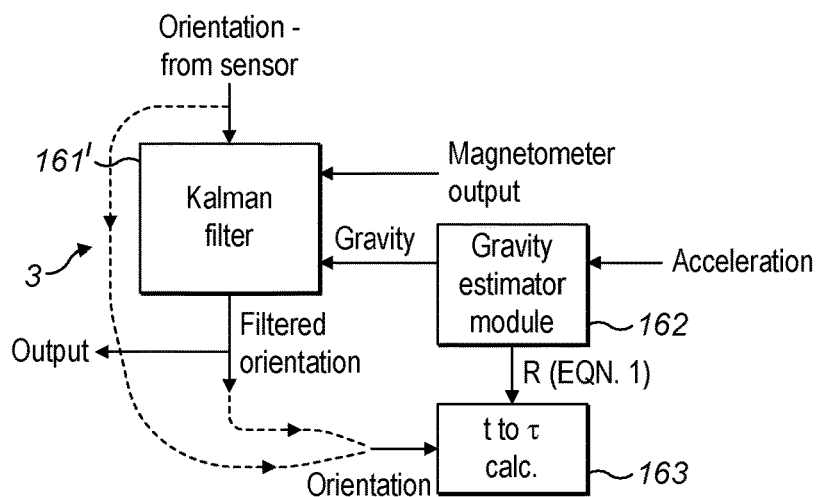
FIG. 16c is diagram of a Kalman filter arrangement for the orientation signal using a gravity as an update signal in accordance with an embodiment of the present invention.

As noted above, the gravity vector estimates are then fed into the Kalman filter as additional observations (along with magnetometer measurements) to estimate the orientation of the device. FIG. 16C shows a more complete version of the details of the orientation tracking module 3 of this embodiment. This has the Kalman filter 161' (as in FIG. 16B) with the gravity signal supplied from a gravity estimator module 162 that performs the calculation of equation (1) above. This module 162 takes as its input a signal indicative of the acceleration of the device (e.g. the raw accelerometer data) and values for the matrix R of Equation 1 provided by a t to τ calculator 163.

Figure 3B:
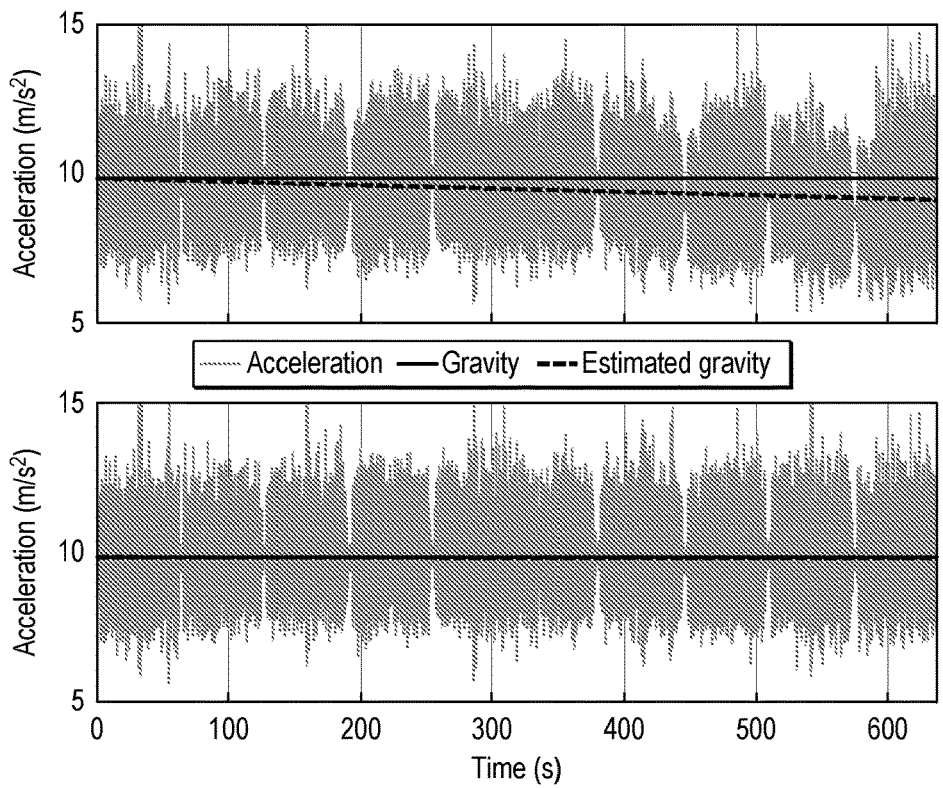
FIG. 3b shows graphs of acceleration estimated with and without a technique of an embodiment of the invention.

The benefits of the orientation tracking approach of this embodiment can be seen as follows. In this first every acceleration vector is converted to the earth coordinate system according to the device orientation estimate at that moment given by the Kalman filter. Then the gravity magnitude is simply estimated as the mean of the acceleration in Z axis in a short window. FIG. 3(b) shows the long term estimate of gravity with and without the proposed orientation tracking algorithm. As expected, the drift of device orientation grows quickly when not using gravity as an update input to the Kalman filter, leading to the gravity magnitude estimate drifting away from the ground truth. This acceleration drift caused by orientation drift can result in miscounting user steps. However, this drift has been successfully corrected by the invention which computes and relies on accurate gravity vector estimates.

Though the proposed gravity estimation algorithm can make the long term orientation tracking of the device robust (i.e. the output of the Kalman filter), it is not sufficient to accurately estimate acceleration on the horizontal plane, which is important for step detection. The major reason is that even a very small tilt of the device, e.g. two degrees, which may not be corrected by the above algorithm, can significantly impact the acceleration signal on the horizontal plane. For instance, a tilt of two degrees can only change the acceleration reading in Z axis from 9.806 m/s² to 9.801 m/s², but it can offset the acceleration on the horizontal plane (either X or Y) by 0.342 m/s². To make things worse, this offset is significantly amplified through double integration which results in large errors in distance estimation. For example, the two degree tilt error can result in an error of up to 20 meters within 10 seconds. The inventors have realised that an improvement can be made using physical constraints from human walking. It is demonstrated in [18] that humans have surprisingly consistent walking patterns for consecutive steps. This embodiment leverages this to provide a better method to estimate and correct the orientation error, called herein repetitive pattern update (REPUT). The method assumes: first, that the velocity and height of the mobile device are almost the same after each step in symmetrical motion mode or every two steps in asymmetrical motion mode (detected as described later below). Second, it assumes that the orientation error, the difference between the estimated orientation from robust orientation tracking and the real orientation, described as a reverse rotation R (distinct from that of Equation 1), is the same during one or two steps.

Using the following notation: a single/double step starting at time $t_0$ with velocity $v_0$ and end at time $t_e$ with velocity $v_e$. The end velocity is expressed as follows:

$$v_e = v_0 + \Sigma_{t=t_0}^{t_e} R \cdot a_t \Delta t \tag{2}$$

where R is the rotation matrix that corrects the orientation drift in the acceleration vector $a^t$ from the device's acceleration sensor at time t, $[a_t^x, a_t^y, a_t^z]$ are the components of $a_t$ at time t expressed in the Earth coordinate system (preferably the NED—North East Down) with z being vertical, and Δt is the acceleration sampling interval. R is similarly expressed in those coordinates.

Then based on the first REPUT assumption, we have $$\Delta v = v_e - v_0 = R \cdot \Sigma_{t=t_0}^{t_e} a_t \cdot \Delta t = 0 \tag{3}$$

Other repetitive patterns can also be formulated. For instance, in 2D positioning the mobile device has the same distance off the ground before and after one step, which can be formulated as $$\Delta l = R \cdot \Sigma_{t=t_0}^{t_e} (\Sigma_{\tau=t_0}^{t} a_\tau^z \cdot \Delta t) \cdot \Delta t = 0 \tag{4}$$

where $a_t^z$ is the vertical acceleration along Z axis. It is possible that these conditions could contradict each other because either the velocity difference Δv or distance difference Δl cannot be strictly zero. Therefore, least-square solutions of the counter-drift rotation matrix R is used with simple optimization. Then the drift can be corrected by rotating the acceleration signal with R, thus:

$a'_t = R^T \cdot a_t$, where a' is the corrected acceleration vector, and $R^T$ is the one calculated from equations (3) and (4) for the interval $t_0$ to $t_e$ containing $a_t$.

Figure 4:
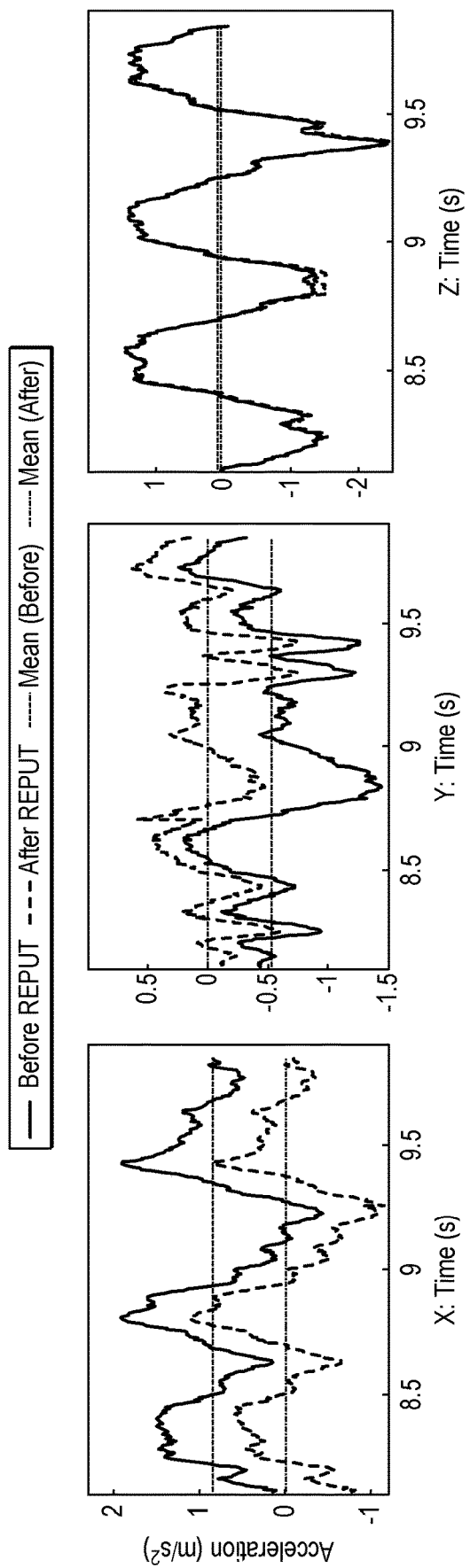
FIG. 4 shows graphs the effect on components of acceleration processed with a technique of an embodiment of the invention.

To test the effectiveness of the REPUT algorithm, we have conducted a simple experiment during which the pedestrian walks normally with the device at hand. FIG. 4 shows a typical example of acceleration signals before and after the REPUT algorithm. It can observed that the acceleration signals along X and Y axes drift significantly over time, if we do not exploit the repetitive pattern assumption; the drift is successfully corrected by REPUT.

Figure 17:
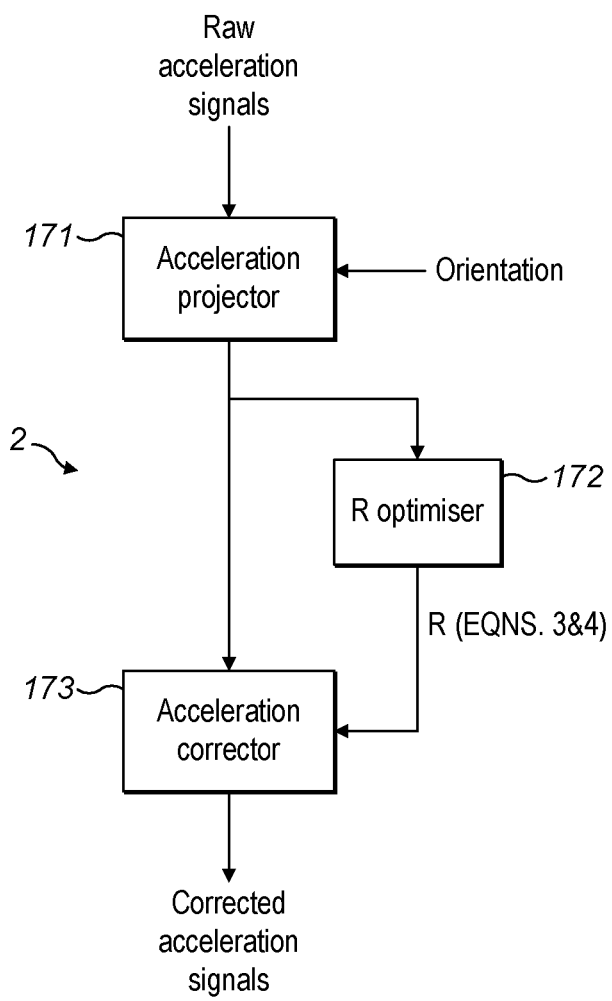
FIG. 17 is a diagram of an acceleration module of an embodiment of the invention.

FIG. 17 shows the preferred form of the acceleration module 2 in which the R matrix is used to correct the acceleration signals to provide acceleration signals output from module 2. First the raw acceleration vector signals have their components converted from those in the device frame to those in the Earth frame by acceleration projector module 171, using orientation signals. The acceleration signals are then applied to the R optimiser module 172 to derive R of Equations 3 and 4, which R is then applied to in turn to the acceleration signals, by an acceleration corrector 173 to correct them as noted above. The R found is applied to the acceleration vectors in the interval $t_0$ to $t_e$, which were used to calculate that value of R.

Above key novel capabilities of R-PDR have been discussed and described below is their use in more robust versions of the four pedestrian dead reckoning steps: namely motion identification, step detection, step length estimation, and heading estimation.

The motion identification module 4 exploits the novel classification scheme described above, which classification consists of two motion classes only—symmetrical and asymmetrical. In addition, it uses the corrected orientation and acceleration (vertical component) signals in order to identify the motion class. The orientation signal in this embodiment is output of FIG. 16C (i.e. the Kalman filtered one), for example the pitch component of that signal is used but since the mobile device can be held in various orientations the roll and yaw are preferably also used, and the appropriate one selected at a particular time. . The acceleration signal is, in this embodiment, the raw signal fro the accelerometer, with gravity subtracted. As can be seen from FIG. 2, in symmetrical motion modes, e.g. texting and phoning, the vertical acceleration signals resemble sine waves, whereas in asymmetrical motion modes, orientation signals are closer to sine waves. FIG. 14A shows the motion identification module 4. DFT modules 141 and 142 respectively compute a discrete Fourier transform (DFT) of each of the acceleration and orientation signals, from the accelerometer (less gravity) and the robust orientation tracking module 3, over the frequency range that corresponds to human walking, typically between 1.2 Hz and 2.5 Hz, thereby detecting the energy in that range. A Bayesian classification module 143 receives those DFTs respectively and decides whether the device placement is resulting in symmetric (vertical acceleration has stronger periodicity than orientation) or asymmetric motion (orientation has stronger periodicity than vertical acceleration), outputting a signal indicting that decision. The energy detector module uses a normalised crossed relation between the DFTs and a two state hidden Markov model to make the decision. So it assesses which one of the vertical acceleration or orientation waveforms has the strongest periodic component.

The motion identification module could use other signals indicative of the orientation and acceleration, in particular raw data from accelerometers commonly used can be used. Also other methods of assessing which has the strongest periodic component may also be used.

Once the motion mode classified, the next task performed is to detect human steps. Typical existing step detection algorithms detect steps by identifying the cyclic patterns in acceleration signal, e.g. peak detection [5], [7], [19], zero-crossings [20]-[22], spectral analysis like Fourier transform [23], [24], short time Fourier transform [25], and continuous wavelet transform [8], and auto/cross correlation [26], [27]. The aforementioned techniques assume that people generate periodic acceleration signals only when walking but this is not true. Hence, they cannot distinguish between a real step and a simple hand swing without the user really moving forward. This is because the two actions can actually generate very similar acceleration signal patterns. The problem of false positive step detection is worse when applying algorithms that use the magnitude of the acceleration signals [28], and is further exacerbated with less constrained motion modes, like crawling, stumbles, side-steps, and shuffles [29]. To summarise, existing techniques only focus on identifying the boundaries of step-like signal segments, referred to as step pattern extraction.

In comparison, the present embodiment not only proposes a novel way of performing step pattern extraction, but also introduces an additional classification step for distinguishing whether the extracted step is real or fake. A real step is herein defined as a step with locomotion, as opposed to a fake step without locomotion. An example of a fake step is one detected when a person swings the phone in her hand without actually moving her legs. Details of the novel step pattern extraction and step classification modules described below.

Figure 15:
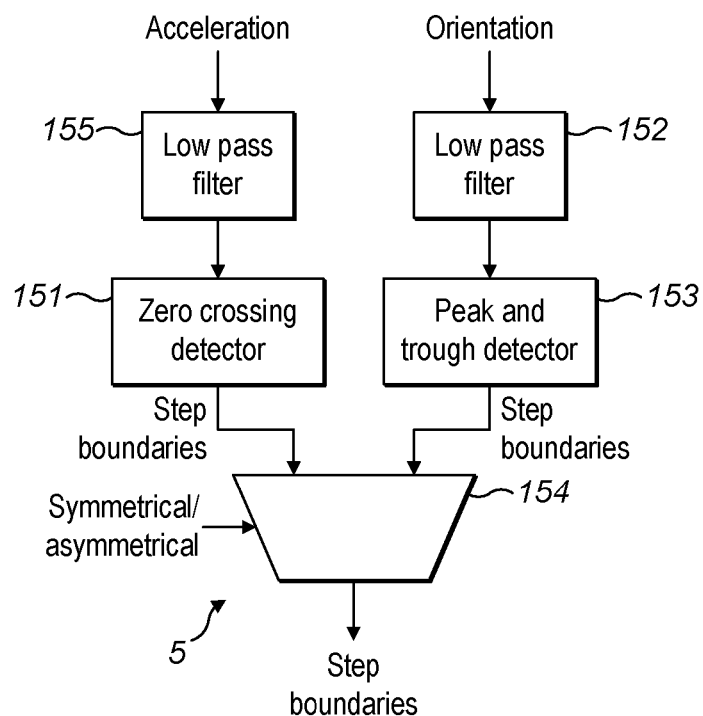
FIG. 15 is a diagram of a step detection module of an embodiment of the invention.

The step identification approach of this embodiment aims to identify the boundaries of step-like signal segments in a lightweight online fashion. In general the approach is to leverage motion identification method described above to extract steps very accurately using time domain analysis. The analysis used depends on whether the motion is identified as symmetrical or asymmetrical. FIG. 15 shows the details of the step detection module 5.

If it is symmetrical, the module 5 uses the vertical component of the acceleration signal for step detection, because it has a simple sine-wave-like pattern in symmetrical motion mode. Step boundaries here are detected with enhanced zero crossing detector 151 similar to [22] applied to the acceleration signal, which produces step boundary indications. However, as shown in FIG. 2, the acceleration patterns of the asymmetrical motion modes differ significantly, making it extremely difficult to identify steps with temporal features like peaks or zero crossings. So, in this case the pitch component of the orientation signal is used to extract the step, because the change of orientation instead of acceleration is highly periodic in asymmetrical motion modes, as shown in FIG. 2. In this case, step boundaries are the peaks and troughs of the device orientation signal—e.g. first step is from trough to peak, second step is from peak to trough etc. However before the orientation signal is applied to the peak and trough detector 153, which detects the peaks and troughs to provide the indications of the step boundaries, the orientation signal is filtered by low-pass filter 152. As can be seen from the two rightmost traces of the orientation signal in FIG. 2 the orientation signal can have some non-fundamental frequency components complicating the shapes of the peaks and troughs, so the filter 153 improves the reliability and accuracy of the peal and trough detection. For reliability, the acceleration signal is also filtered by a low-pass filter 155 before it is applied to zero crossing detector 151.

A multiplexer 154 is shown as part of the step detection module 5, connected to receive the step boundary indications form the zero-crossing detector 151 and the peak and trough detector 153 and to choose between them based on the indication, from the motion identification module 4, of whether the motion is symmetric or asymmetric. In this embodiment the modules are implemented in software and the multiplexer is only symbolic—the software first checks the indication of whether the motion is symmetric or asymmetric and only performs the detection of step boundaries on the acceleration or orientation signals accordingly, to save computing resources.

As noted above the user can hold the device in various orientations s the module selects which a component of the orientation signal to make the detection of peaks and troughs.

The step pattern extraction step does not distinguish between real and fake steps. A further classification step is provided that takes into account informative features of the orientation and acceleration signals. In particular, the horizontal and vertical displacements are informative features in telling whether real locomotion happens to the mobile device. In this embodiment they are derived from the double integration of the acceleration signal during one step (in the x-y plane/z axis respectively) but other methods are possible. These two features are extremely informative because they can capture the fundamental difference between real and fake steps. In real steps, the horizontal displacement is higher and the vertical displacement is lower than in fake steps. The cross correlation between the acceleration signal and the orientation signal is also identified as an effective feature to reject fake steps because the acceleration and orientation signals tend to have the same period if we shake the device, which is not true for normal walking behaviour. (Equally the orientation may be cross correlated with the velocity—e.g. formed by a single integration of the acceleration—or with the displacement since they have the same period as the acceleration have the same period in a periodic motion.) The orientation offset is another feature used for real/false step classification. The orientation offset measures how much the orientation has changed during one step. This feature is proposed to prevent the acceleration generated from making turns from being taken into account in calculating the horizontal and vertical displacement. The strong features defined above allow us to accurately distinguish between real and fake steps using, in this embodiment a simple decision tree. In general the module provided for disguising real and fake steps from those signals can be, for example, any machine learning or Bayesian classifier (decision tree, svm, neural networks, etc.).

Figure 5A:
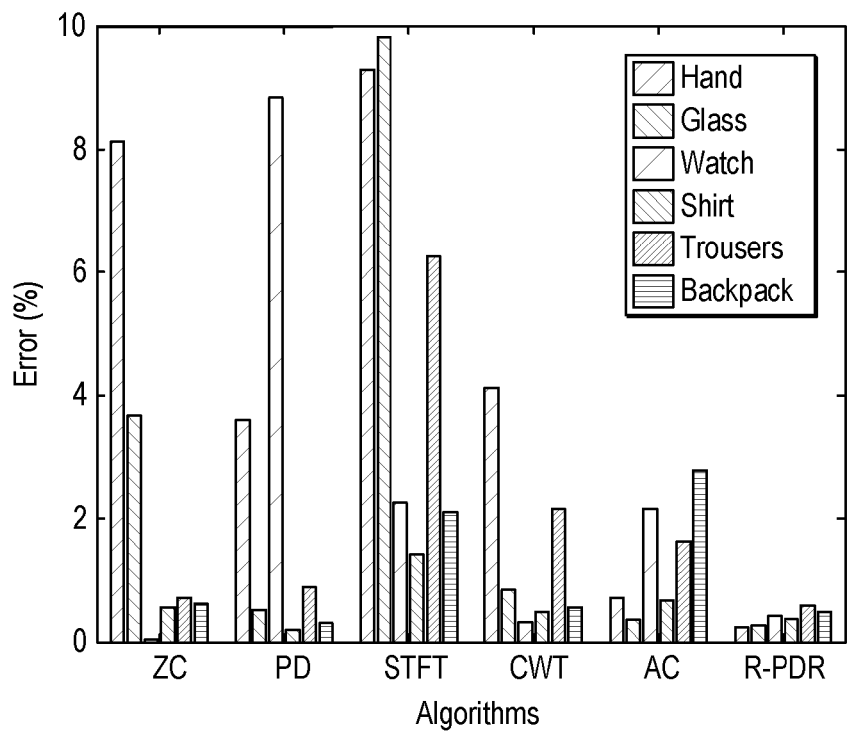
FIG. 5a shows a comparison of the detection of user step according to different techniques and different placements of a device on a user's body.

A series of experiments was preformed to compare the Step Detection method of this embodiment with state-of-the-art step detection algorithms, including peak detection (PD) [19], zero-crossing detection (ZD) [22], short time Fourier transform (STFT) [30], continuous wavelet transform (CWT) [31], and auto-correlation (AC) [27]. The experiments involve different users, attachments and a total of over 15,000 real steps. The step detection accuracy of the competing approaches in our experiments is similar to the accuracy reported in [25]. FIG. 5(a) shows the step detection accuracy of the method of the present embodiment and competing approaches. It is observed that the method of this embodiment consistently features very high accuracy regardless of the device attachment. The performance of existing algorithms in determining whether a step has actually been taken or not, using data from a number of behaviours that are repetitive but do not correspond to forward displacement is also now demonstrated. Each behaviour, such as tapping, nodding, and foot tapping, was performed 200 times. It is observed from FIG. 5(b) that the method of the this embodiment reports close to 0 real steps while all other algorithms report approximately 200 steps, which demonstrates the effectiveness of the method if this embodiment rejecting false positive steps.

R-Step Length Estimation: Unlike for the foot-mounted inertial navigation system [32], double integration of the acceleration to get the step length is not applicable to handheld devices, reasons being zero velocity update (ZUPT) is not available for handheld devices because only the heel can be regarded as (almost) static when one foot is planted on the floor during walking period. Various models have been proposed to address the step length estimation problem. The simplest approach is to make it a constant [33] because pedestrians have surprisingly constant step length with a natural walking pace [18]. However, when walking with others, people are likely to adjust their natural walking pace, which leads to a significant change of the step length [29]. The most common approaches used to estimate the step length are linear [6], [8] or nonlinear [5], [7] model to relate the step length to variables like pedestrian height, step frequency, acceleration variance, etc. These models are easy to implement and thus widely adopted in practice. An alternative of the linear/nonlinear model is regression. Machine learning regression techniques like support vector machine [3], [28] and neural networks [34] have also been applied based on various features extracted from the sensor data.

This embodiment uses a simple step length model [35], which uses accelerometer data to detect the step frequency (denoted with $f_t$ at time t) which is later used to estimate step length $I_t$ as follows:

$$l_t = h(\alpha f_t + \beta) + \gamma \qquad (5)$$

where h is the pedestrian height, $\alpha$ is the step frequency coefficient, $\beta$ is the step constant given pedestrian height, and $\gamma$ is the step constant.

The accuracy of this model is not satisfactory by itself because step length parameters vary across different users and environments. The R-Step Length Estimation method of this embodiment however benefits from being fed with carefully configured parameter values thanks to the feedback loop between R-PDR and Map Matching. This is referred to here as unsupervised lifelong learning approach as LL-Tracker, and describe in detail later below.

R-Heading Estimation: To estimate the heading of the pedestrians, most existing work assumes the knowledge of the position where the mobile device is attached, thereby making the assumption that the heading of the pedestrian is always consistent with the heading of the mobile devices [36], which is not true in real world settings. Zee [27] demonstrated that the heading can be estimated by observing the frequency spectrum of a typical walk. Although this is an interesting idea, it suffers from direction ambiguity. Walk-Compass [4] samples the acceleration signal during the segment of a step with maximum deceleration. After removing noise and rotating samples to a stable coordinate system, it averages them to obtain the walking direction in 3D. It then projects the estimated direction to the horizontal walk plane. This approach works for various device placements, but is sensitive to noise as shown below.

In this embodiment, instead of averaging like WalkCompass, a straight line that best matches the acceleration readings of a single step in the horizontal plane (the two components X and Y) is fitted using simple least squares. (Other regression methods such as Bayesian regression can be used instead of least squares.) We disambiguate between the two headings of the straight line using the first 50% of acceleration samples. If the residual error from the least square method is small (FIG. 6(a) top and middle) the resulting estimate is used as the offset between device and user heading; otherwise (FIG. 6(a) bottom), we use the most recent offset that was reliably estimated.

Figure 6A:
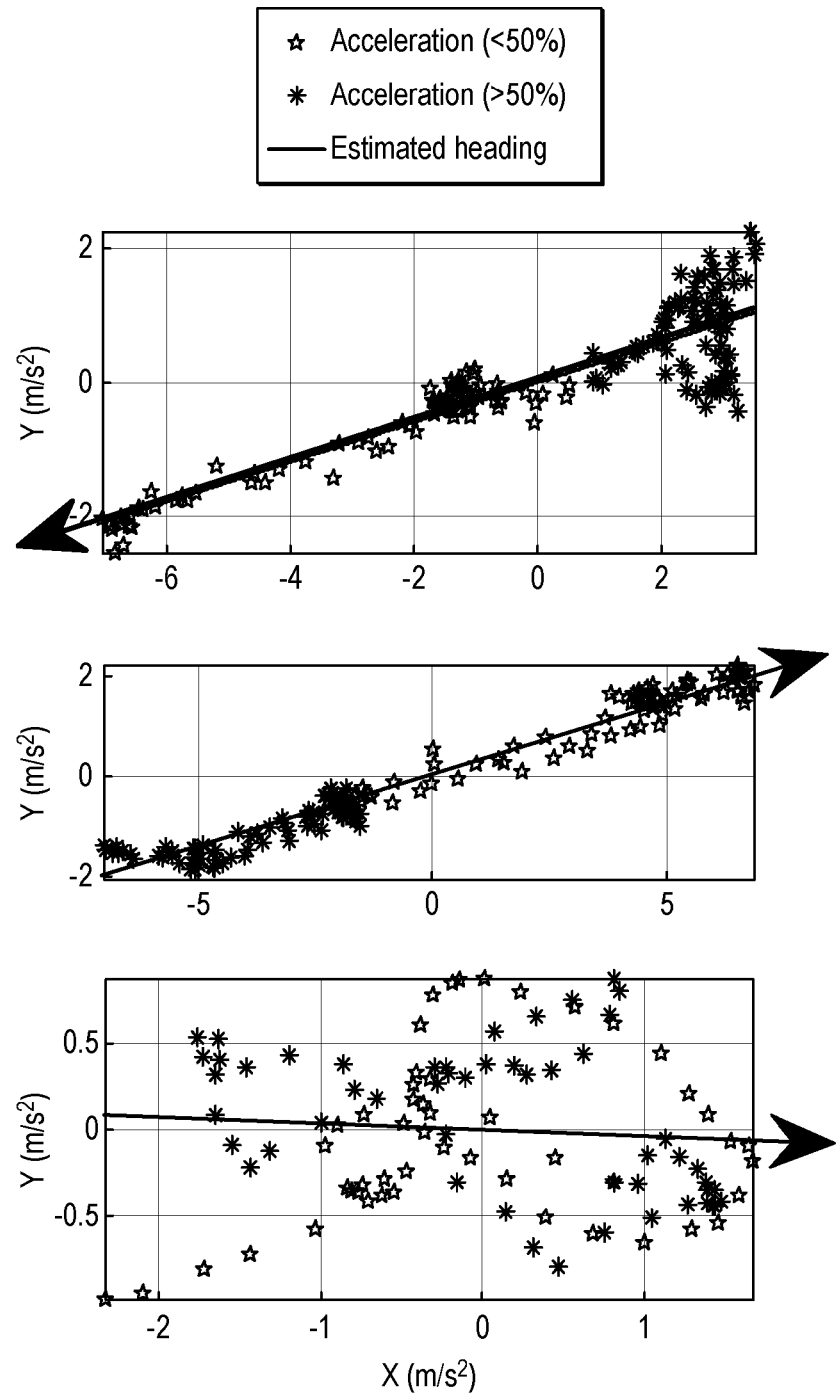
FIG. 6a is a set of graphs illustrating least squares heading estimation in an embodiment of the invention.
Figure 6B:
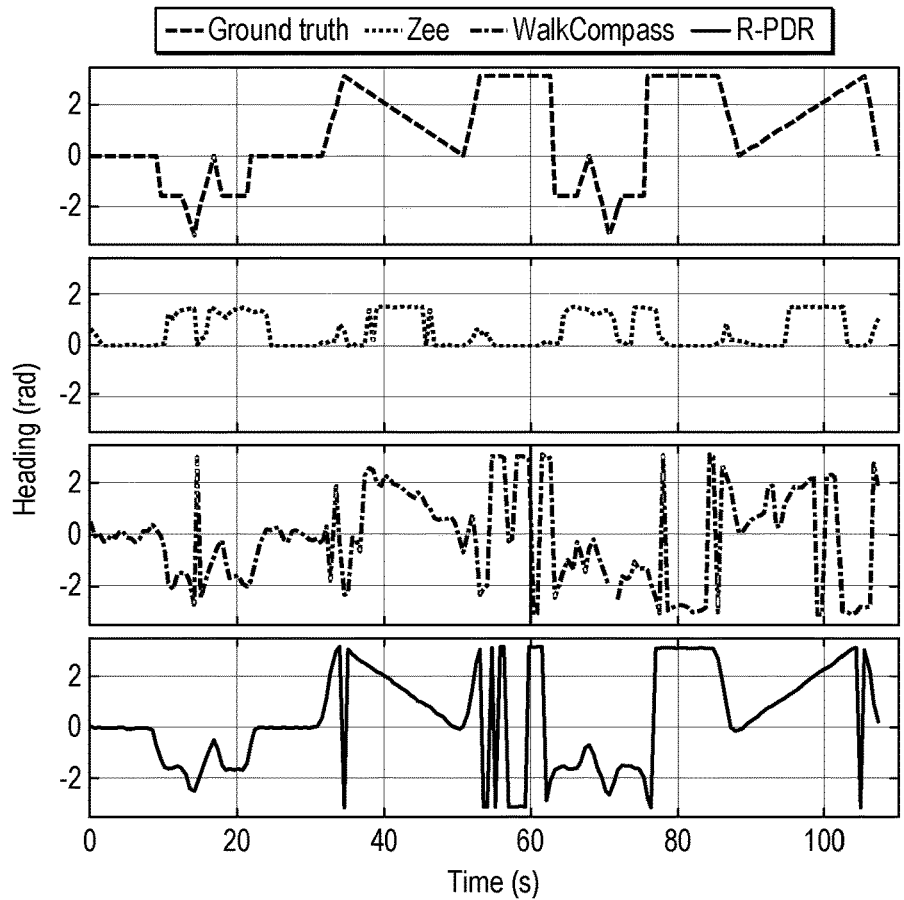
FIG. 6b is a comparison of various heading estimation techniques.
Figure 6C:
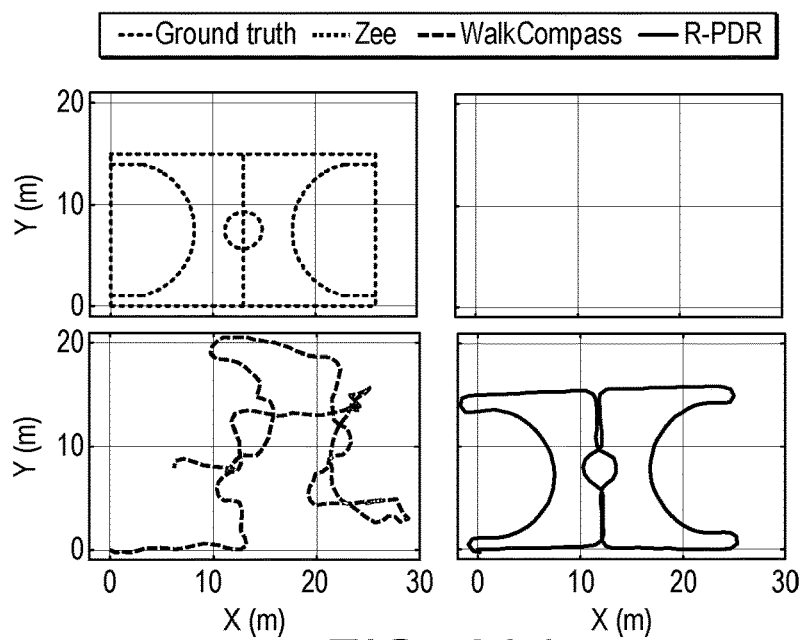
FIG. 6c is a comparison of measured trajectories obtained by various heading estimation techniques.

FIGS. 6(b) and 6(c) compares the technique of this embodiment and competing techniques for tracking a user in a sports centre for 110 seconds. Notice that the proposed R-PDR approach can detect and avoid noisy heading estimates, thus yielding higher accuracy than the competing approaches. The heading estimation of this embodiment relies on being able to correctly rotate acceleration data to the earth coordinate system. This requires accurate device orientation estimates, which in turn depends on the quality of gyro data as discussed above. This embodiment addresses the issue of long term drift of the gyro sensors as discussed above, and further improves the accuracy of R-Heading Estimation, by learning the sensor bias via the lifelong learning approach of LL-Tracker, as discussed below.

Background: Although the proposed R-PDR is robust to device, attachment and user motion variability, it does not fully address the problem that all PDR algorithms suffer from—the fact that over time, the estimated position drifts further away from the true position. A well-established approach to correcting the long-term drift in PDR is to use map constraints, such as those encoded in floor plans, radio RSSI maps and magnetic distortion maps. This is a reasonable assumption given the wide availability of maps (esp. floor plans), and the intensive effort invested by major players, such as Google, Microsoft, Apple and Qualcomm, in indoor mapping. The map matching layer can be implemented in a number of ways. Traditionally, it has used recursive Bayesian filters such as HMMs, Kalman Filters and Particle Filters, the latter being the most widely used approach due to its simplicity, ease of implementation and accuracy when a large number of particles is used. More recently, a novel approach based on undirected graphical models (specifically, conditional random fields) was introduced, and shown to be more lightweight and accurate than competing Bayesian filters [1]. In this paper, it was argued that although the map matching layer has already a key role in indoor positioning, it has yet to achieve its full potential. It can be used not only for correcting the long-term drift in the PDR trajectory, but also for the novel purpose of lifelong learning. Similar to humans who become better at finding their whereabouts as they visit the same environment multiple times, so should an indoor positioning algorithm as it runs repeatedly in the same context. This idea is not entirely new in indoor positioning. An illustrative example is the implementation of map matching using a Simultaneous Localisation And Mapping approach, such as WiFiSLAM [37]. Bayesian filters are also adapted in map matching, e.g. Zee [27], [36], where the radio map or the magnetic distortion map [38] are learned after the trajectories have been matched to a given map. In principle, the more a user visits an environment, the more accurate the inferred radio maps become, and the better the performance of map matching.

However, so far, the concept of lifelong learning has only been used to optimise the functionality of the map matching layer itself. In stark contrast, in this embodiment, information from the map matching layer is used to play a key role in optimising the performance of the R-PDR layer. It can be used to learn a variety of parameters such as those that depend on the device/device attachment (e.g. sensor bias), or on the user/environment (e.g. step length parameters). This system of a end-to-end lifelong learning tracking system is referred to here as LL-Tracker. This consists of R-PDR 10, map matching 20 and a feedback loop from map matching to R-PDR, as shown in FIG. 1. In what follows, first described is the parameter learning process, which is central to the feedback loop, and then followed by a couple of illustrative examples.

The accuracy of R-PDR depends on a number of parameters employed in its four modules 4, 5, 6 and 7. These are hard to tune manually because they may depend on the device, attachment, user and environment. To address this issue, to the present embodiment uses an unsupervised approach to learning R-PDR parameters. The method is triggered every time the map constraints are such that there is one and only one possibility for a matched trajectory that can best support the raw trajectory with high probability. This guarantees the existence and uniqueness of the matched trajectory solution. When this condition is met, R-PDR parameter tuning becomes the following optimization problem:

$$x^* = \underset{x}{\mathrm{argmax}} \ln p(S(x)|Z(x)) \tag{6}$$

where x is the parameter (or vector of parameters) of R-PDR (or indeed another PDR implementation) that requires tuning, S(x) is the matched trajectory and Z(x) is the raw trajectory fed from R-PDR to map matching. The key idea is that only when the estimated parameter values are the same as (or very close to) the correct ones, can we maximize the conditional probability of the matched trajectory given the raw trajectory. The solution to this optimization can be obtained with the expectation maximization (EM) approach. However, the soft EM approach does not work because the optimization of parameters x in the M-step actually changes the state space of the model, which makes the E-step unable to evaluate the expectation in the next iteration [1]. Therefore, the hard EM approach, also known as Viterbi training is employed to solve the optimization problem [39].

The following are a couple of examples that demonstrate the effectiveness of the feedback loop between R-PDR and map matching for parameter tuning.

Learning of gyro bias: The learning of sensor bias, especially for low-cost sensors, is crucial to the performance of PDR algorithms. The motion sensor bias is the bottleneck that stops the inertial tracking from being widely used because the sensor bias is accumulated, leading to significant errors in the trajectory, especially when used in open space where no additional constraints can be applied. To make things worse, motion sensors also suffer from both time drift and thermal drift, which makes the bias varying with time and temperature. Therefore, the lifelong learning of sensor bias is essential to accurate PDR tracking. In practice all three motion sensors that are usually available, the accelerometer, magnetometer, and gyroscope, have drift or error. However, of all those three motion sensors, the gyroscope plays the key role in terms of determining the accurate orientation of the device, which builds the foundation for long-term tracking. In addition, the calibration of gyroscope sensors is especially difficult compared to the calibration of accelerometers and magnetometers. Therefore, the learning of the gyroscope bias is a highly useful capability. Experiments to test the effectiveness of the sensor bias learning were conducted. FIG. 11 shows the trajectory with one Nexus 5 device in an indoor basketball court without any floorplan or other map constraints. It is observed that the trajectory largely deviates from the ground truth without sensor bias learning. It is greatly improved in terms of heading estimation after the sensor bias of this device has been learned in a completely different (office) environment shown in FIG. 13(a). This example serves to show how lifelong learning can exploit one environment's structure to benefit navigation in more challenging open space environments. The implications of cross-environment learning can extend to other users: the high tracking accuracy of a user with "lifelong learning experience" can be exploited to create an accurate radio map of the environment, which can in turn benefit other algorithms like WiFiSLAM [37] and users tracking with only radio maps.

Figure 8C:
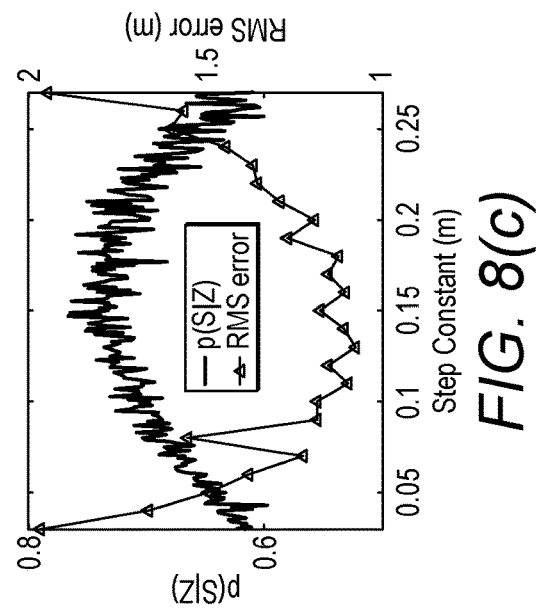
FIGS. 8a, 8b and 8c show experimental results showing the importance and effectiveness of the life long learning in accordance with an embodiment of the invention on step length estimation.
Figure 8B:
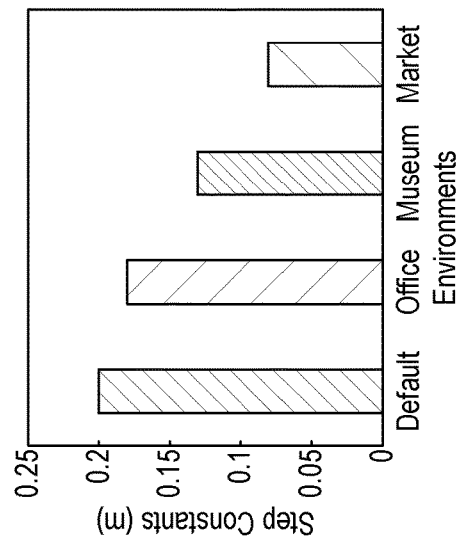

Learning of step length constant: The second example shows how we can use the feedback loop between R-PDR and map matching to improve the performance of R-Step Length Estimation, module 6 of the R-PDR 10. In particular, the method of this embodiment was used to learn the step constant γ (Eqn. (5)) for different individuals because 1) the average step length plays a crucial role in the tracking accuracy due to the high consistency of step length in human walking patterns; and 2) the parameters α and β are very similar for different individuals in our experiments. We have conducted experiments in an office environment, a museum environment, and a market to show the effectiveness of the feedback loop on step length estimation. Notice in FIG. 8(a) that the step constants γ are very different for different pedestrians (U1 to U4), and very different even for the same pedestrian in different environments (office, museum, and market) as shown in FIG. 8(b). FIG. 8(c) shows that the step constant that maximizes the conditional probability p(S|Z) also minimizes the RMS error of tracking, allowing us to cope with user and environment variability.

In this embodiment the above calculations are carried out on the processor or processors of the mobile carried by the user, under the control of software. In this embodiment The software has the module structure as described above. In alternative embodiments, some or all of the calculations described may be performed by hard-wired circuits.

In alternative embodiments the calculations may be carried out on other devices, e.g. computers, connected to the device by a communications link. The computer be local, for example in a building that the user uis navigating, or distant, for example connected to the device the Internet.

EVALUATION

Sites: LL-Tracker has been evaluated and compared against competing approaches in three real-world settings with known floor plans: an office building (65×35 m$^2$), a museum (109×89 m$^2$), and a sports center hall (30×20 m$^2$). For the majority of the tests, the office building was used as it has the most distorted trajectories. Overall, 224 trajectories of average length over 400 m were collected over 30 days. Error is expressed in [m] RMS.

Participants: The variations between different people were taken into account by acquiring data from 15 people of different genders, heights, and ages. During the experiments, the subjects were mounted with several devices simultaneously in different parts of the body, typically hand, watch, glasses, shirt pocket, and trousers pocket. Then they walked anywhere in the building without planned routes, to realistically capture real pedestrian motion, rather than artificial, constant speed trajectories. They were told to move freely and may have different motion modes including walking, standing still, sitting down, bending to pick up something on the floor, etc.

Devices and Implementation: Different types of mobile devices and wearable sensors were involved in the experiments, including LG Nexus 4, LG Nexus 5, Asus Nexus 7, Samsung Galaxy S IV, x-IMU-1, and x-IMU-2. These devices differ greatly in terms of sensors, functionality and price. A snapshot of our application prototype has been shown in FIG. 1.

Ground Truth: To provide accurate ground truth, numbered labels were placed along corridors and within rooms on a 2 m grid. During the experiments, the test subject always held one camera at hand. These labels were filmed at the same time experiments were conducted. The time-synchronized video streams were then mapped to locations on the floorplan, and intermediate locations interpolated using footstep timing, also obtained from the video.

Proposed Algorithms: In this section we evaluate the performance of two methods of the invention and two competing end-to-end positioning solutions. The ones of the invention are LL-Tracker and R-Tracker. In particular, LL-Tracker combines R-PDR and map matching with lifelong learning, i.e. with the feedback loop from map matching to fine tune the parameters of R-PDR. On the other hand, R-Tracker consists of R-PDR and map matching without lifelong learning.

Competing Algorithms: Practical indoor positioning algorithms were required to be infrastructure-free or use existing infrastructures like WiFi and Bluetooth low energy (BLE). Existing practical algorithms fall into two categories: RF category where only WiFi/BLE are used and fusion category where inertial data and WiFi/BLE data are fused to perform positioning. Typical examples in the RF category are HORUS [40], RADAR [41], and EZ [42]. The state-of-the-art algorithms in the fusion category are MapCraft [1], Zee [27], UnLoc [43], WifiSLAM [37], and the algorithm in [36]. To evaluate the performance of LL-Tracker, the algorithm that reports the best accuracy from each category was selected, namely HORUS from RF category and MapCraft from fusion category, as competing approaches. HORUS [40] is a fingerprinting-based localization approach which uses an existing radio map, e.g. RSS-location pairs denoted with <$R_i, L_i$>, i=1 ... N. To localize mobile devices, HORUS 1) takes a set of RSS r, 2) estimates the likelihood of this set given RSS-location pairs in the radio map as $$p(r|R_i) = \Pi_{j=1}^M p(r_j = R_{i,j}|L_i) \quad (7)$$

where M is the dimension of r and $p(r_j=R_{i,j}|L_i)$ is the distribution of the RSS at location $L_i$ (usually assumed to be Gaussian) and then 3) selects the location from the pair with the highest likelihood or a weighted mean of all locations based on the likelihood as the estimated location. MapCraft [1] is a recently proposed lightweight indoor positioning algorithm, which employs conditional random fields for map matching. It has reported an RMS error of around 1~2 meters but, so far, it has been designed and implemented with the assumption of mobile devices held by the user in text mode. To avoid penalising it for this reason, we compare the performance of the proposed algorithms using a variety of mobile device attachments, to that of MapCraft using a single device attachment (text mode).

Figure 9A:
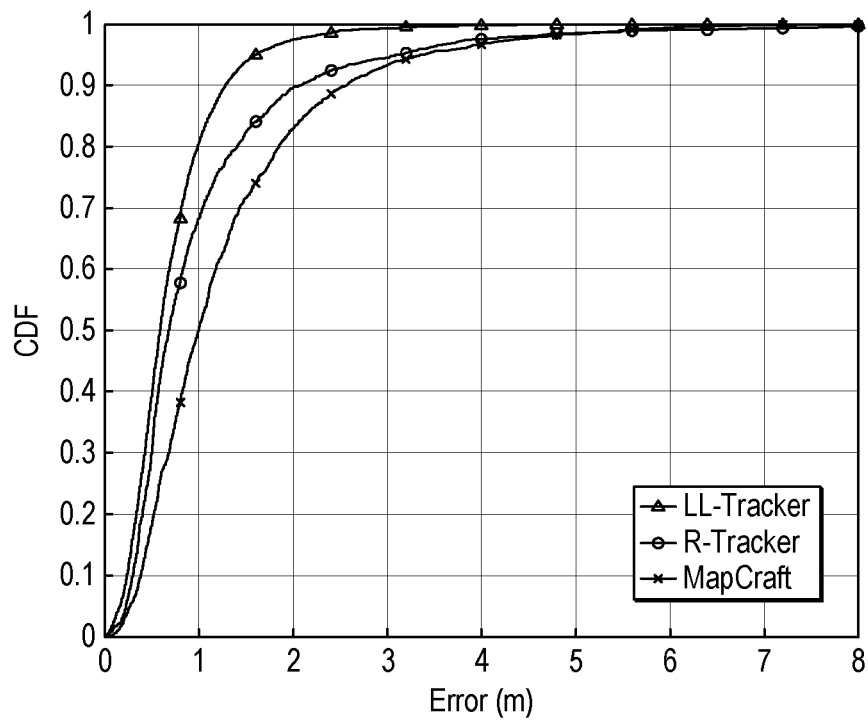
FIGS. 9a and 9b are graphs comparing the accuracy of various tracking algorithms.
Figure 9B:
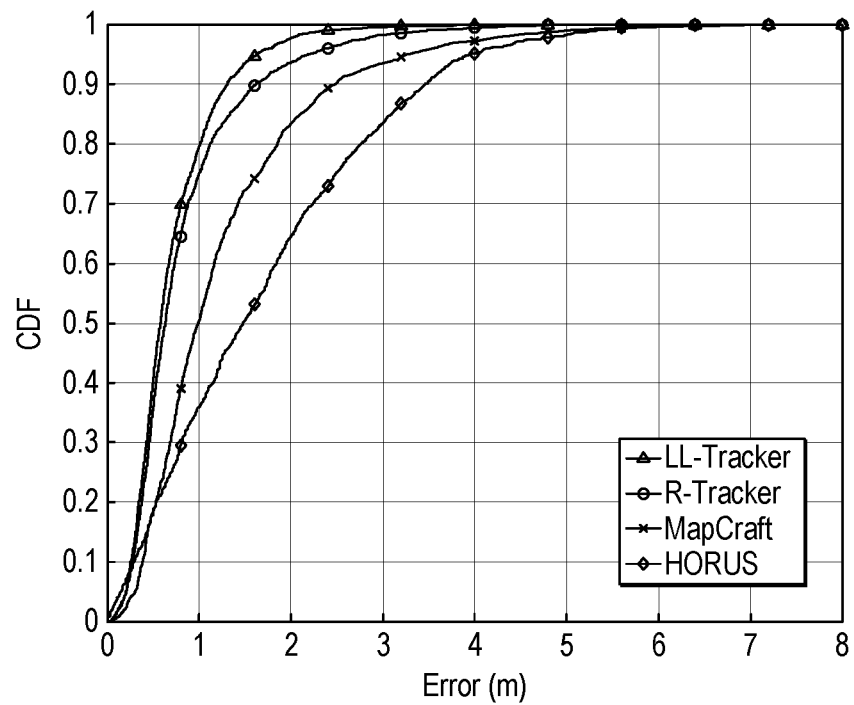

A. Accuracy To evaluate the accuracy of the proposed LL-Tracker, experiments were conducted with 15 users, 5 different devices and 5 different attachments in the office and museum environments. The same IMU and WFi data were fed into the proposed LL-Tracker, R-Tracker, and the competing MapCraft and HORUS. FIG. 9 compares the error cumulative distribution function of the four approaches. It is observed from FIG. 9(a) that LL-Tracker outperforms all other approaches, followed by R-Tracker, and lastly MapCraft when only IMU sensors are used. The RMS errors for these three approaches are 0.87 m (LL-Tracker), 1.36 m (R-Tracker), and 1.69 m (MapCraft). Note that LL-Tracker, R-Tracker, and MapCraft use inertial measurements at the pedestrian dead reckoning layer and perform map matching using information about the environment's floor plan—they do not assume knowledge of a radio map, although they can flexibly exploit this information if it becomes available. The performance of these three approaches and HORUS were then compared, when a WiFi radio map was available and used by all approaches. It can be observed from FIG. 9(b) that LLTracker also has the best accuracy with a RMS error of 0.86 m, followed by R-Tracker (1.07 m), MapCraft (1.61 m), and HORUS (4.62 m). Note that LL-Tracker, R-Tracker, and MapCraft fuses IMU data, radio map and floor plan constraints while HORUS only exploits knowledge of the radio map, but does not perform map matching.

B. Robustness The next set of experiments was designed to validate the robustness of the proposed LL-Tracker as we change the experimental conditions.

Figure 10C:
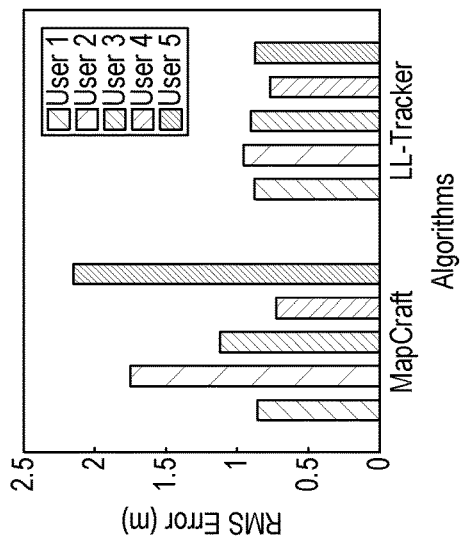
FIGS. 10a, 10b and 10c are graphs demonstrating the effectiveness of lifelong parameter methods.
Figure 10B:
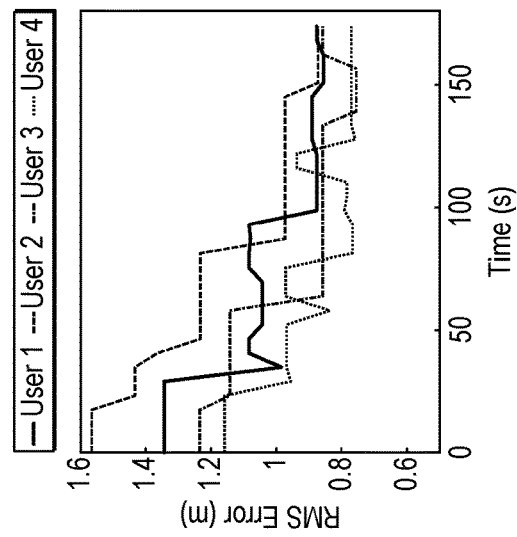
Figure 10A:
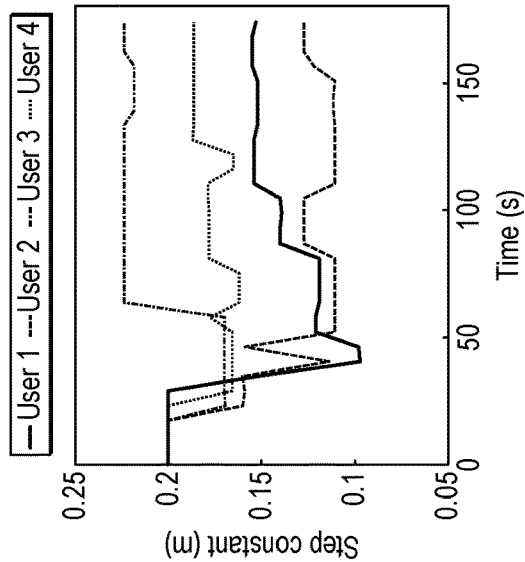

User Variability: To evaluate the robustness over the user variability, 15 different people with different genders, ages from 20 to 55, and height from 150 cm to 190 cm were involved in the experiments. To minimize the impacts from other factors, the experiment site was fixed to be the office environment, the device to be Nexus 5 phone and attachment to be handheld only. Different step constant parameters were learned for different pedestrians. FIG. 10(a) shows some typical step constants for different people in the office environment and the time taken to learn these parameters. FIG. 10(b) shows how the tracking performance has been improved with the convergence of the parameter learning. It is also shown in FIG. 10(c) that the proposed LL-Tracker has almost the same RMS tracking error regardless of different users while the counterpart, MapCraft, has individual specific tracking errors.

Device Variability: To evaluate the robustness over the device variability, five different devices, including Nexus 5, Nexus 4, Samsung S4, X-IMU 1 and X-IMU2 were involved in the experiments. Again, other variables like the experiment site (office environment), users (User 1), and attachment (handheld) were fixed. It is shown in FIG. 11(b) that the tracking accuracy for different devices are remarkably stable after each device has been used for 5~10 minutes. The trend is especially apparent for the devices used in open space like the sports centre where no map constraints are available to improve the tracking accuracy. It is observed that after walking for 0.5 km in the basketball court, the RMS tracking error can be as high as 15 m without the bias learning algorithms while the error can decrease to around only 2 m if the gyro bias has been learned in the office environments before it is used in the basketball court. In addition, in the office environment where the map matching can compensate for the sensor bias, the sensor bias learning still improves the tracking accuracy by over 20% (from 0.96 m to 0.75 m).

Attachment Variability: Five typical attachments were tested in this experiment to evaluate the robustness of LL-Tracker, including handheld, watch, glasses, shirt pocket, and trousers pocket. This experiment was also conducted by User 1 with Nexus 5 phone in the office environment. It is observed from FIG. 11(c) that the RMS errors of LL-Tracker are extremely similar for different attachments. Please note that MapCraft only works for handheld attachment.

Figure 12A:
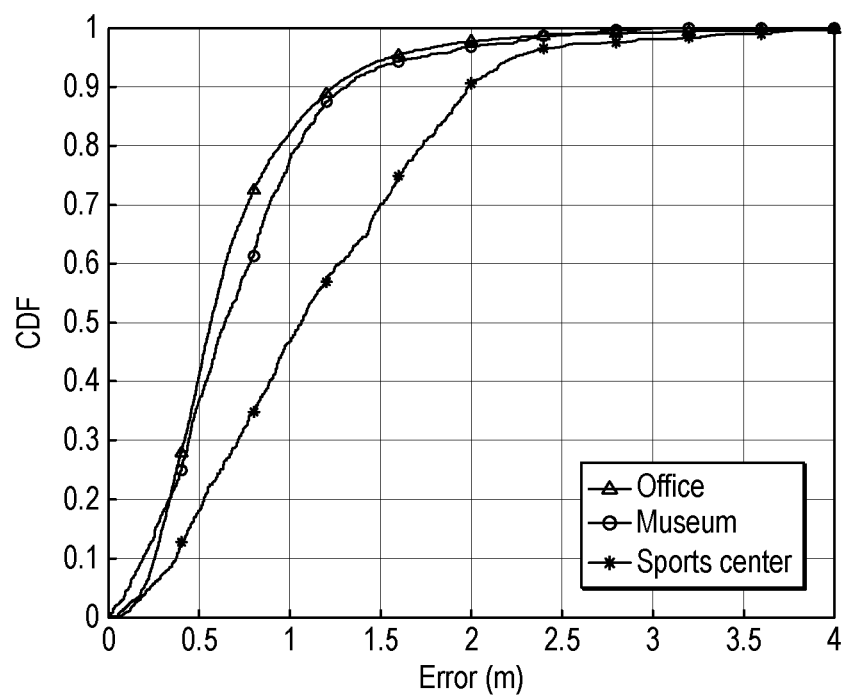
FIGS. 12a and 12b show the performance of an embodiment of the invention in various environments.

Environment Variability: The performance of LL-Tracker was evaluated in a variety of environments, namely an office environment, a museum, and a sports center. All of these environments have different floor plans and methods of construction which affect the obtained sensor data. The museum was a multi-storey stone building with large, open spaces. Testing was conducted on the ground floor. The office environment (where the majority of the tests have been conducted) was a multi-storey office building with a stone and brick construction, reinforced with metal bars; testing was conducted on the fourth floor. The sports center was a big multi-functional hall where the experiments were conducted in the basketball court for the convenience of ground truth collection. In this set of experiments, data from all 15 experiment subjects, 5 different devices, and 5 different attachments were taken into account. We have taken very complex and tortuous trajectories which typically are the weakness of inertial tracking systems, due to drift and the absence of absolute anchor measurements. FIG. 13 shows a couple of illustrative examples of how LL-Tracker succeeds in accurately tracking a pedestrian through the office and museum environments. The cumulative distribution functions of these environments are shown in FIG. 12(a). The RMS errors are 0.86 m in the office and 0.90 m in the museum. Note that LL-Tracker starts tuning R-PDR parameters after it converges to a single trajectory on the map with high probability; the CDF of the convergence distance in the office and museum environments is presented in FIG. 12(b). The performance in open space is always the limitation of PDR algorithms because the errors can be accumulated quickly within a short time when no external constraints, e.g. the floor plan, can be utilized to correct the drift, especially with low-cost IMU sensors. In order to understand the limitation of the proposed R-PDR algorithm, we have tested the performance of various devices in a sports center with results reported in FIG. 12(a). The devices used in this experiment have been calibrated with the feedback loop from map matching layer in the office environment shown in FIG. 13(b). It is observed that the proposed LL-Tracker only has a RMS error of around 1.27 meters even in open space (basketball court) with trajectories as long as 0.5 km. An example trajectory in this environment can be found in FIG. 7(c).

FIGURE LEGENDS

FIG. 1. System architecture of LL-Tracker.

FIG. 2. Acceleration and orientation signals of some typical motions. Note how symmetrical motions have strong periodicity in acceleration, whereas asymmetrical motion has strong periodicity in pitch.

FIG. 3. Illustrative examples of robust orientation estimation.

FIG. 3(a) Gravity estimated using different techniques.

FIG. 3(b) Vertical acceleration without (top) and with robust gravity estimation (bottom).

FIG. 4. Acceleration signals before and after REPUT. According to the walking nature of human beings, the X and Y acceleration signals are expected to have mean values close to zero in a window. However, the mean acceleration drifts significantly away from zero without REPUT.

FIG. 5. Experiment results showing the step counting accuracy and ability to reject false steps of the proposed R-PDR algorithm.

FIG. 5(a) Step counting in different device attachments.

Figure 5B:
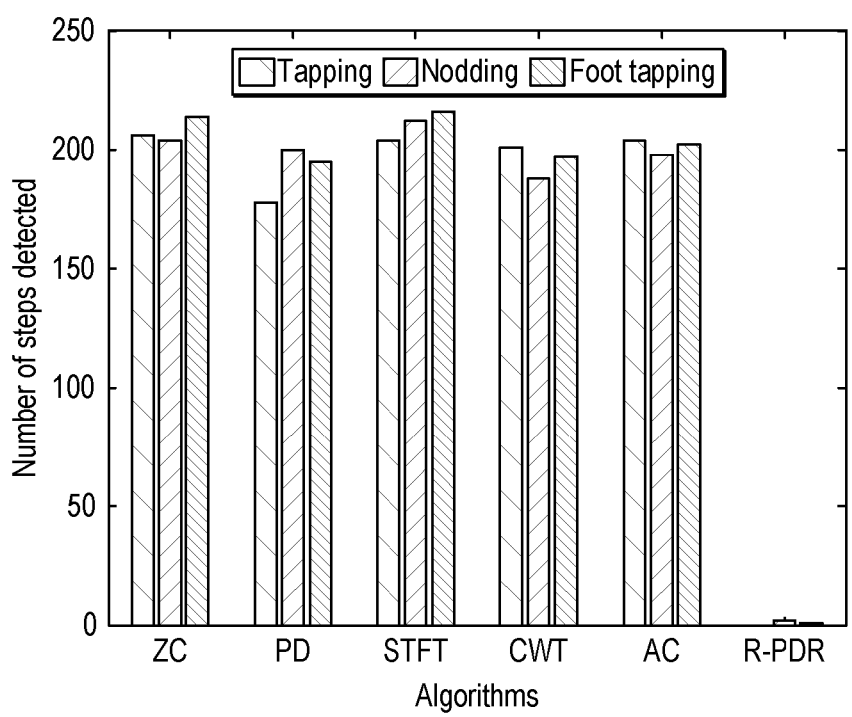
FIG. 5b shows a comparison of the rejection of various non-step motions of user according to different techniques.

FIG. 5(b) Ability to reject false steps.

FIG. 6. Heading estimation: algorithm and illustrative example.

FIG. 6(a) Least squares heading estimation.

FIG. 6(b) Comparison of heading estimation techniques.

FIG. 6(c) Example of heading estimation in a real trace.

FIG. 7. Inertial trajectories of 0.5 km in a basketball court without any map constraints before and after sensor bias learning, showing an improvement in loop closing loop error from 17.3 m to 2.3 m, and demonstrating the importance and effectiveness of the learning algorithm.

Figure 7C:
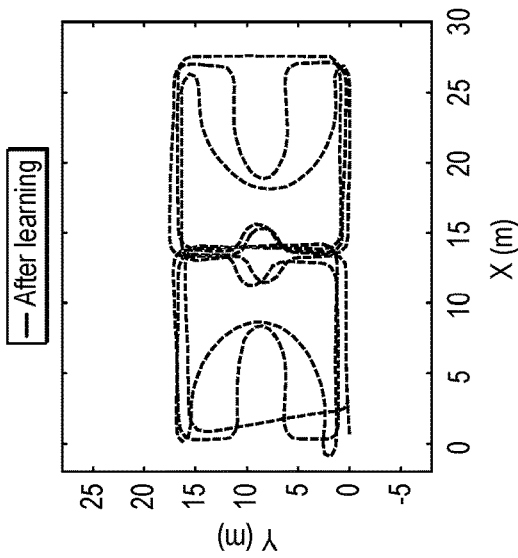
FIGS. 7a, 7b and 7c show a series of trajectories demonstrating the efficacy of learning sensor bias.
Figure 7B:
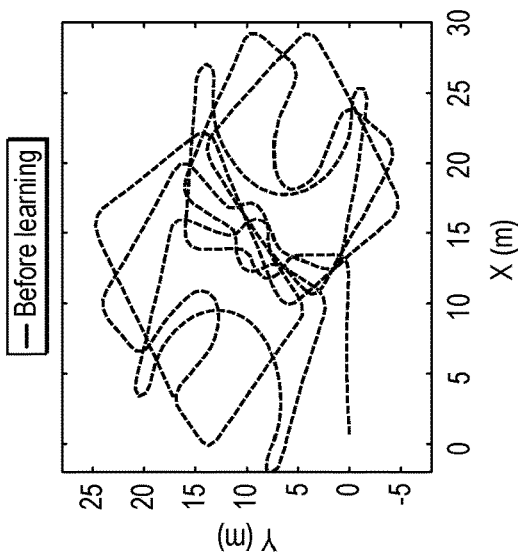
Figure 7A:
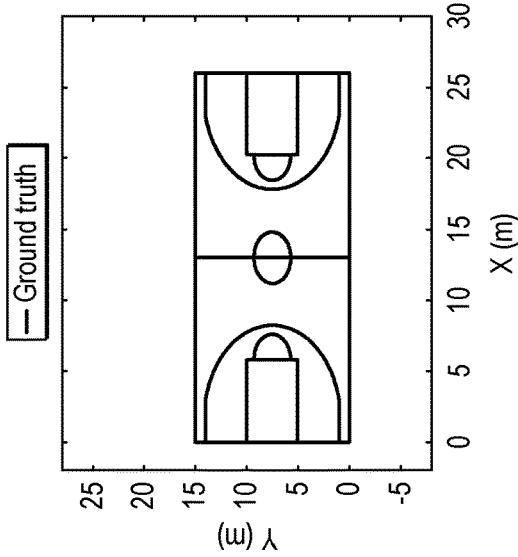

FIG. 7(a) Trajectory ground truth.

FIG. 7(b) Trajectory before bias learning.

FIG. 7(c) Trajectory after bias learning.

FIG. 8. Experiments results showing the importance and effectiveness of the proposed lifelong learning approach on step length estimation.

Figure 8A:
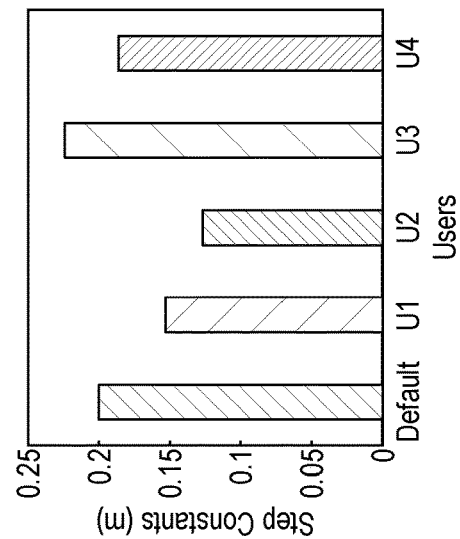

FIG. 8(a) Step constants of different pedestrians in an office environment.

FIG. 8(b) Step constants of the same pedestrian in different environments.

FIG. 8(c) The step constant that maximises p(SIZ) in (6) minimizes RMS error.

FIG. 9. Accuracy comparison of various tracking algorithms.

FIG. 9(a) IMU only.

FIG. 9(b) IMU+WiFi.

FIG. 10. Tracking accuracy of LL-Tracker with different devices, showing the effectiveness of the lifelong parameter learning algorithms.

FIG. 10(a) Step learning results.

FIG. 10(b) Step learning performance.

FIG. 10(c) User variability comparison.

FIG. 11. Tracking accuracy of LL-Tracker with different devices and attachments, showing the effectiveness of the lifelong bias learning algorithms. The bias was learned in the office environment for a period of time, and then tested both in the same office and a completely different sports centre environment.

Figure 11A:
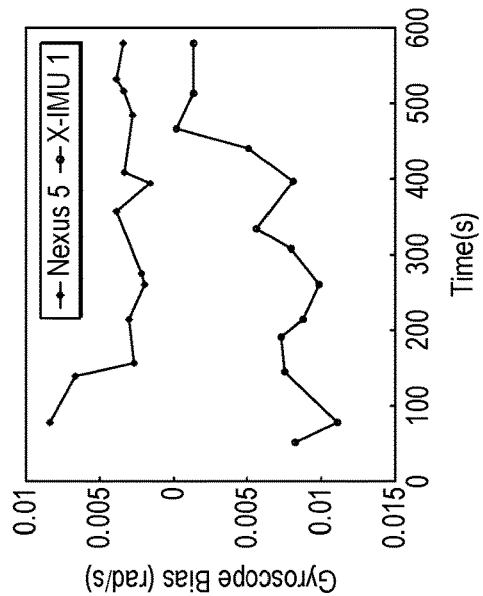
FIGS. 11a, 11b and 11c are graphs demonstrating the effectiveness of lifelong bias learning.
Figure 11B:
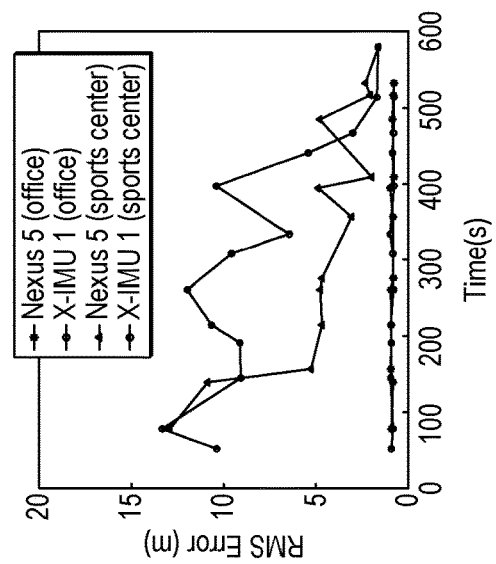

FIG. 11(a) Bias learning results.

FIG. 11(b) Impact of bias learning on error.

Figure 11C:
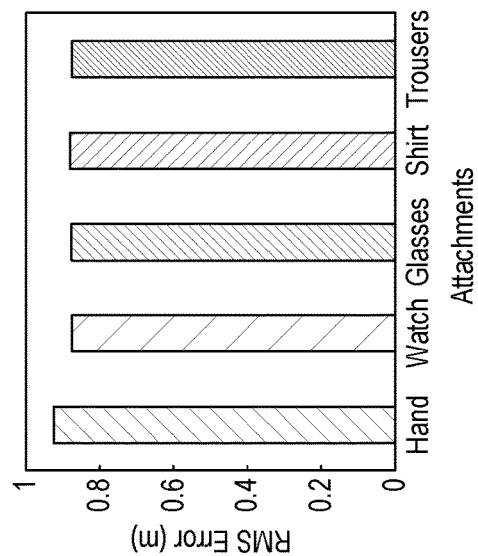

FIG. 11(c) Attachment variability.

FIG. 12. The performance of proposed LL-Tracker in multi-sites.

FIG. 12(a) Multi-site performance to validate the robustness of LL-Tracker against environmental variations.

Figure 12B:
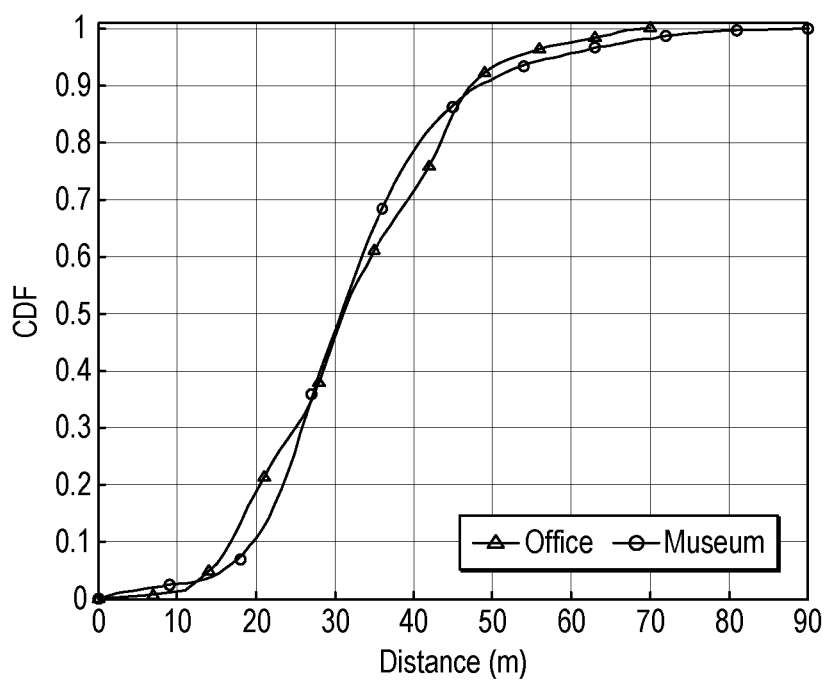

FIG. 12(b) Convergence distance of the proposed learning algorithms.

FIG. 13. Experiments in the office and museum sites, showing the ground truth and reconstructed trajectories.

Figure 13A:
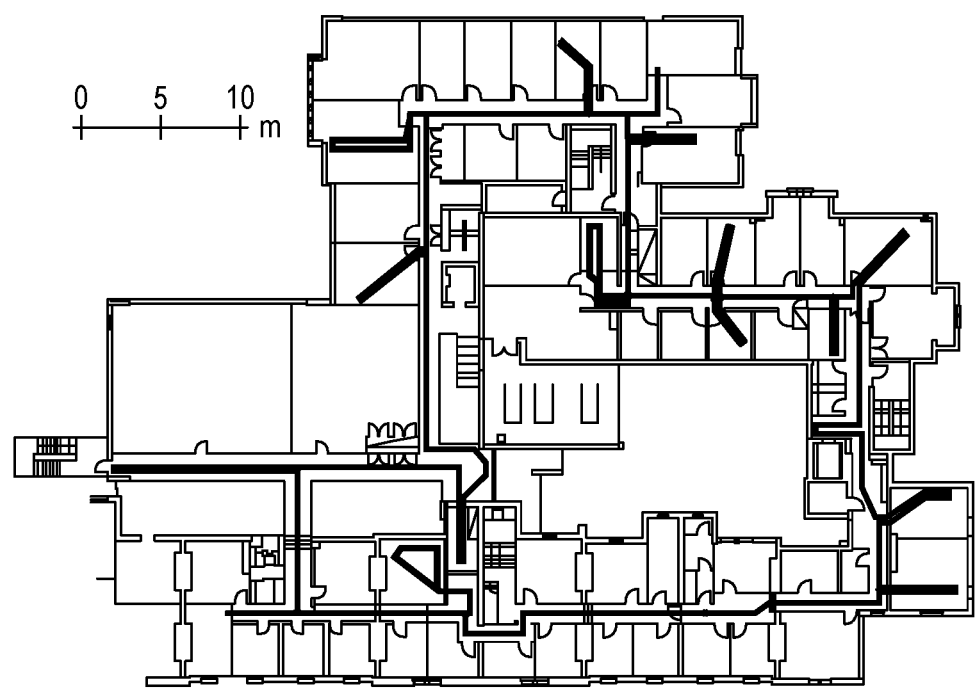
FIGS. 13a, 13b, 13c and 13d illustrate experiments performed in various environments.

FIG. 13(a) Office ground truth.

Figure 13B:
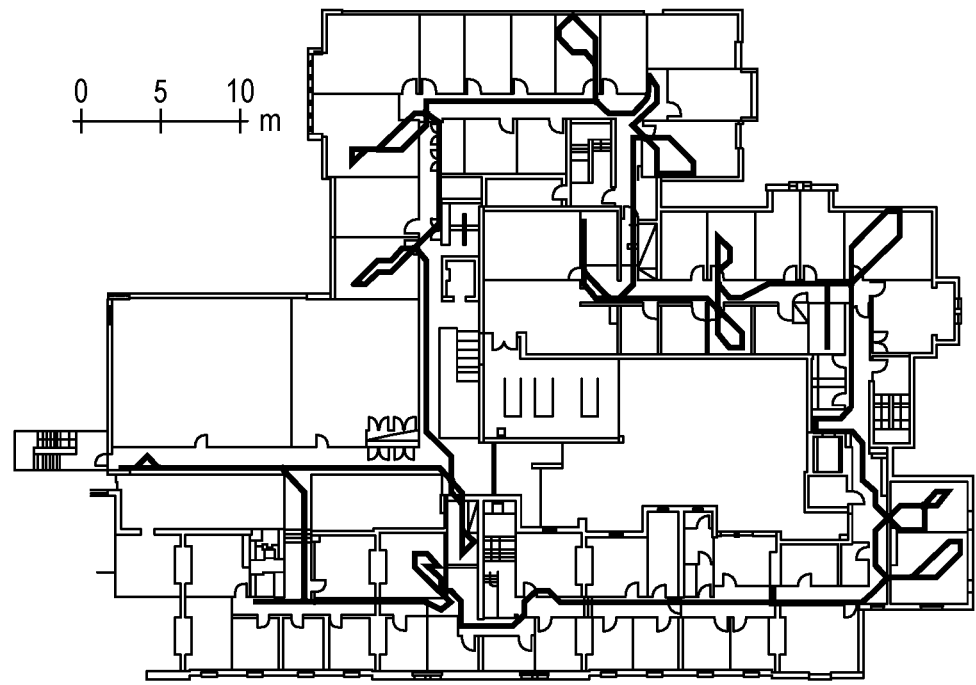

FIG. 13(b) Reconstructed trajectory.

Figure 13C:
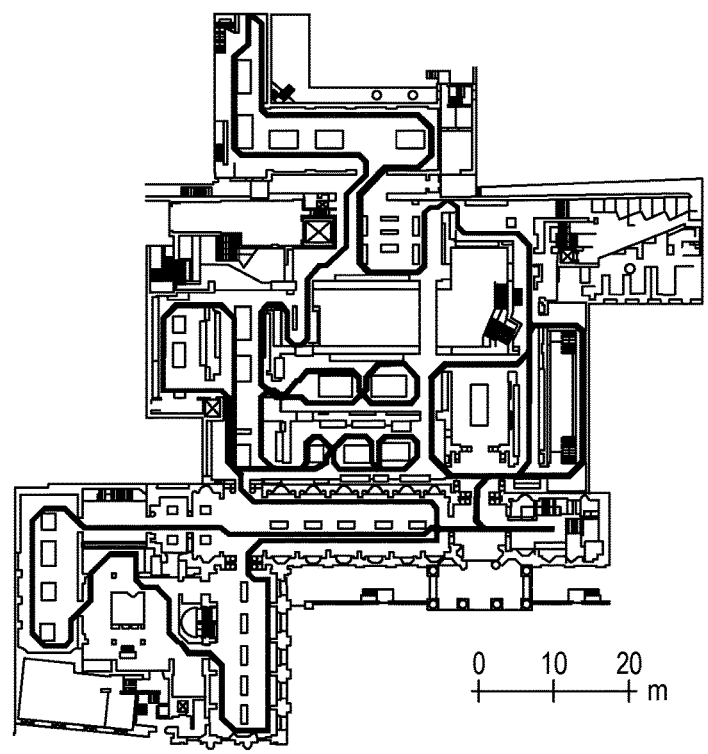

FIG. 13(c) Museum ground truth.

Figure 13D:
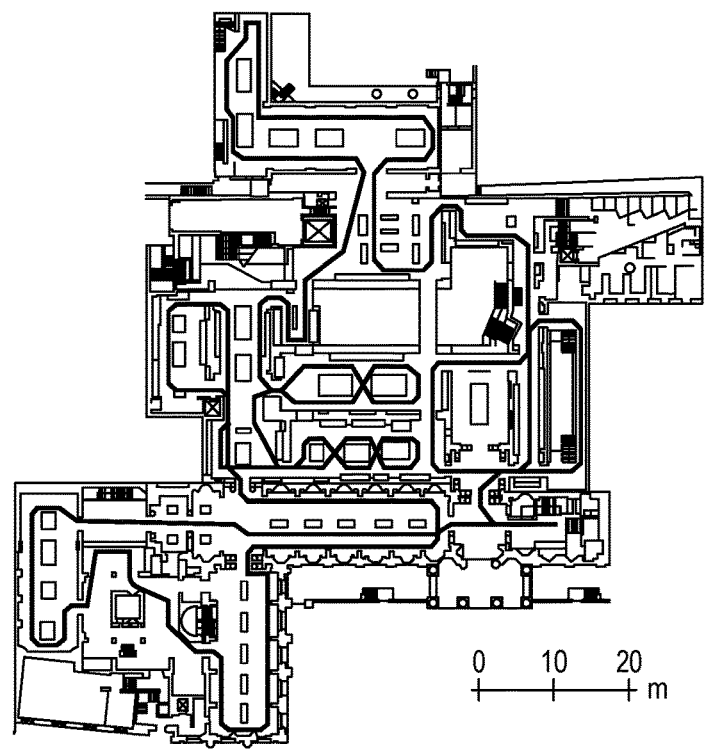

FIG. 13(d) Reconstructed trajectory.

The invention claimed is:

1. A method of optimising an orientation error for a device carried by a user, the orientation error being the difference between an estimated orientation calculated from signals from one or more sensors of the device and the real orientation, the method comprising:

receiving acceleration and orientation signals from the one or more sensors responsive to the acceleration and orientation of the device, classifying motion of the device as a symmetric motion mode or an asymmetrical motion mode, the symmetric motion mode having similar periodic acceleration signals with a period corresponding to a single step of the user, and the asymmetrical motion mode having similar periodic orientation patterns with a period corresponding to two steps of the user, obtaining a set of vector values of the acceleration of the device from the acceleration signals for an interval of one or more whole periods of a single step, or a two steps, of the user, according to the classification of the motion of the device as the symmetrical motion mode or the asymmetrical motion mode, and optimising the orientation error using the set of acceleration values subject to physical constraints on the motion that apply during the interval.

2. The method as claimed in claim 1 wherein the physical constraints include that the orientation error is constant during the interval.

3. The method as claimed in claim 1 wherein the physical constraints include that the device is the same at the beginning and end of the interval.

4. The method as claimed in claim 1, wherein the physical constraints include that the vertical velocity, with respect to the Earth, of the device does not change over the interval.

5. The method as claimed in claim 1, wherein the physical constraints include that the horizontal velocity, with respect to the Earth, of the device does not change over the interval.

6. The method as claimed in claim 1, wherein the physical constraints include that the 3D velocity, with respect to the Earth, of the device does not change over the interval.

7. The method as claimed in claim 1 wherein the optimising is by regression.

8. The method as claimed in claim 7 wherein the optimising is by the method of least squares.

9. The method as claimed in claim 7 wherein the optimising is Bayesian regression.

10. The method as claimed in claim 1 wherein the optimising comprises optimising the following equations for R:

$$\Delta v = v_e - v_0 = R \cdot \Sigma_{t=t_0}^{t_e} a_t \cdot \Delta t = 0 \text{ and}$$

$$\Delta l = R \cdot \Sigma_{t=t_0}^{t_e} (\Sigma_{\tau=t_0}^{t} a_\tau^z \cdot \Delta t) \cdot \Delta t = 0,$$

where $a^t$ are the vector acceleration values for the device, t is time, times $t_0$ and $t_e$ are respective times at the beginning and end of the interval, $v_0$ and $v_e$ are velocity values at times $t_0$ and $t_e$ respectively, $\Delta t$ and $\Delta \tau$ are the interval between acceleration values, $a^z$ is the acceleration along the vertical axis, $\Delta l$ is the change in height of the device over the interval, $\Delta v$ is the change in velocity over the interval, and R is a matrix representing the orientation error.

11. The method as claimed in claim 1 wherein the number of whole periods of a step, or a double step, of the interval is one.

12. The method as claimed in claim 1 wherein the coordinates in which the acceleration is expressed are those of a coordinate system fixed with respect to the Earth.

13. A method of correcting acceleration signals obtained from sensors of a device, the method comprising:

performing the method of optimising an orientation error according to claim 1, and applying the orientation error to acceleration signals of the interval.

14. A method of determining the position of a mobile device in a geographical area, the device having one or more sensors that provide information about the motion of the device, wherein the position is determined using detected steps of a user carrying the device, and wherein the method comprises the steps of:
   detecting steps of the user carrying the device from the signals from the sensors by detecting a pattern of boundaries between steps using the signals from the sensors,
   classifying a detected step as a real step of the user, or a fake step where the user does not take a real step,
   wherein the classification is performed by: comparing features of signals from the sensors indicative of one or more of acceleration, velocity, displacement, and orientation at times related to that step.

15. The method as claimed in claim 14 wherein the comparing includes a feature of the horizontal displacement signal.

16. The method as claimed in claim 14 wherein the comparing includes a feature of the vertical displacement signal.

17. The method as claimed in claim 14 wherein the comparing includes comparing the horizontal displacement signal to the vertical displacement signal.

18. The method as claimed in claim 17 wherein the comparing includes deciding which of the horizontal and vertical displacements is larger.

19. The method as claimed in claim 17 wherein at least one of the vertical and/or horizontal displacement signals are formed by double integrating the acceleration signals.

20. The method as claimed in claim 14 wherein the comparing includes cross correlating the orientation with the acceleration signals.

21. The method as claimed in claim 14 wherein the comparing includes cross correlating the orientation with the velocity or displacement signals.

22. The method as claimed in claim 21 wherein the velocity or displacement signals are formed by respectively single or double integration of the acceleration signal.

23. The method as claimed in claim 14 wherein the comparing includes examining an orientation offset, that being the change in orientation between the beginning and end of a step of the user.

* * * * *